(12) United States Patent
Trent, Jr. et al.

(10) Patent No.: US 9,465,532 B2
(45) Date of Patent: Oct. 11, 2016

(54) METHOD AND APPARATUS FOR OPERATING IN POINTING AND ENHANCED GESTURING MODES

(75) Inventors: Raymond A. Trent, Jr., Santa Clara, CA (US); Theodore A. Theocheung, Santa Clara, CA (US)

(73) Assignee: Synaptics Incorporated, San Jose, CA (US)

( * ) Notice: Subject to any disclaimer, the term of this patent is extended or adjusted under 35 U.S.C. 154(b) by 963 days.

(21) Appl. No.: 12/967,779

(22) Filed: Dec. 14, 2010

(65) Prior Publication Data

US 2011/0154268 A1    Jun. 23, 2011

Related U.S. Application Data

(63) Continuation-in-part of application No. 12/836,397, filed on Jul. 14, 2010.

(60) Provisional application No. 61/288,109, filed on Dec. 18, 2009, provisional application No. 61/311,040, filed on Mar. 5, 2010, provisional application No. 61/352,712, filed on Jun. 8, 2010.

(51) Int. Cl.
  *G06F 3/048*    (2013.01)
  *G06F 3/0488*   (2013.01)
  *G06F 3/01*     (2006.01)

(52) U.S. Cl.
  CPC .......... *G06F 3/04883* (2013.01); *G06F 3/017* (2013.01); *G06F 3/0488* (2013.01)

(58) Field of Classification Search
  CPC ... G06F 3/017; G06F 3/04883; G06F 3/0488
  USPC .................................. 715/863, 702; 345/173
  See application file for complete search history.

(56) References Cited

U.S. PATENT DOCUMENTS

| | | | |
|---|---|---|---|
| 5,907,234 A | 5/1999 | Sadek et al. | |
| 6,057,845 A | 5/2000 | Dupouy | |

(Continued)

FOREIGN PATENT DOCUMENTS

| | | |
|---|---|---|
| CN | 101436099 A | 5/2009 |
| GB | 2433402 A | 6/2007 |

(Continued)

OTHER PUBLICATIONS

USPTO, Non-final Office Action for U.S. Appl. No. 12/836,397 dated Sep. 25, 2012.

(Continued)

*Primary Examiner* — Ajay Bhatia
*Assistant Examiner* — Phuong Nguyen
(74) *Attorney, Agent, or Firm* — Osha Liang LLP

(57) ABSTRACT

Methods and apparatuses for implementing gesture command recognition functionality is disclosed. The apparatuses may operate in a pointing mode and operate in an enhanced gesturing mode. While in the enhanced gesturing mode, the apparatuses may cause associated actions in response to recognizing sliding inputs as gesture commands. The gesture commands may be selectively associated with actions based on localities. The apparatuses may present overlays with information content independent of gesture command recognition. The apparatuses may change appearances of visual representations of sliding inputs in response to recognizing the sliding inputs as gesture commands.

18 Claims, 14 Drawing Sheets

(56) References Cited

U.S. PATENT DOCUMENTS

| | | | |
|---|---|---|---|
| 6,249,606 | B1 | 6/2001 | Kiraly et al. |
| 6,639,584 | B1 | 10/2003 | Li |
| 6,888,536 | B2 | 5/2005 | Westerman et al. |
| 6,958,749 | B1 | 10/2005 | Matsushita et al. |
| 7,030,861 | B1 | 4/2006 | Westerman et al. |
| 7,352,364 | B2 | 4/2008 | Wang |
| 7,372,993 | B2 | 5/2008 | Lagardere et al. |
| 7,382,360 | B2 | 6/2008 | Mackey et al. |
| 7,477,233 | B2 | 1/2009 | Duncan et al. |
| 7,730,401 | B2 | 6/2010 | Gillespie et al. |
| 8,239,784 | B2 | 8/2012 | Hotelling et al. |
| 2002/0055361 | A1* | 5/2002 | McDonnell et al. ......... 455/456 |
| 2002/0180707 | A1 | 12/2002 | Sato et al. |
| 2004/0215479 | A1* | 10/2004 | Dorsey et al. ..................... 705/1 |
| 2005/0052427 | A1 | 3/2005 | Wu et al. |
| 2006/0026535 | A1 | 2/2006 | Hotelling et al. |
| 2006/0026536 | A1 | 2/2006 | Hotelling et al. |
| 2006/0170651 | A1* | 8/2006 | Sasaki ........................... 345/156 |
| 2006/0232563 | A1 | 10/2006 | Lii et al. |
| 2006/0238522 | A1 | 10/2006 | Westerman et al. |
| 2007/0070052 | A1 | 3/2007 | Westerman et al. |
| 2007/0236475 | A1 | 10/2007 | Wherry |
| 2007/0242056 | A1 | 10/2007 | Engelhardt et al. |
| 2008/0019591 | A1* | 1/2008 | Iwayama et al. ............. 382/187 |
| 2008/0165141 | A1 | 7/2008 | Christie |
| 2008/0195645 | A1 | 8/2008 | Lapstun et al. |
| 2009/0037849 | A1* | 2/2009 | Immonen et al. ............ 715/863 |
| 2009/0058820 | A1 | 3/2009 | Hinckley |
| 2009/0128501 | A1 | 5/2009 | Lazaridis et al. |
| 2009/0195506 | A1* | 8/2009 | Geidl et al. ................... 345/168 |
| 2009/0278812 | A1 | 11/2009 | Yasutake |
| 2010/0064261 | A1 | 3/2010 | Andrews et al. |
| 2010/0100945 | A1* | 4/2010 | Ozzie et al. ....................... 726/5 |
| 2010/0110031 | A1 | 5/2010 | Miyazawa et al. |
| 2010/0185989 | A1* | 7/2010 | Shiplacoff et al. ........... 715/856 |
| 2010/0207892 | A1* | 8/2010 | Lin et al. ....................... 345/173 |
| 2011/0010676 | A1* | 1/2011 | Khosravy et al. ............ 715/863 |
| 2011/0029862 | A1* | 2/2011 | Scott et al. .................... 715/261 |

FOREIGN PATENT DOCUMENTS

| | | | |
|---|---|---|---|
| JP | 07013676 | A | 1/1995 |
| JP | 2000137555 | A | 5/2000 |
| JP | 2000137571 | A | 5/2000 |
| JP | 2001134382 | A | 5/2001 |
| JP | 2006099468 | A | 4/2006 |
| JP | 2010517197 | A | 5/2010 |
| WO | 200208881 | A2 | 1/2002 |
| WO | 2008094791 | A2 | 8/2008 |

OTHER PUBLICATIONS

Malik, S., et al., "Visual Touchpad: a Two-handed Gestural Input Device", ICMI'04, Oct. 13-15, 2004, State College, Pennsylvania, USA (ACM 1-58113-890-3/04/0010).

Wu, M., et al., "Multi-Finger and Whole Hand Gestural Interaction Techniques for Multi-User Tabletop Displays", UIST '03 Vancouver, BC, Canada (ACM 1-58113-636-06/03/0010.

Alphatrack Frequently Asked Questions, Frontier Designs. Retrieved on Apr. 1, 2009; Retrieved from Internet: URL: http://www.frontierdesign.com/Products/AlphaTrack/FAQs.

Tips for Typing, Fingerworks, Retrieved from Internet on Apr. 1, 2009; Retrieved from Internet: URL: http://www.fingerworks.com/typing.html.

FireGestures, Retrieved from Internet on Aug. 23, 2010; Retrieved from Internet: URL: http://www.xuldev.org/firegestures/.

FireGestures, Features, Retrieved from Internet on Aug. 23, 2010; Retrieved from Internet: URL:http://www.xuldev.org/firegestures/features.php.

gMote, Retrieved from Internet on Aug. 23, 2010; Retrieved from Internet: URL: http://handform.net/gmote.php.

gMote, Thanks for using gMote, Retrieved from Internet on Aug. 23, 2010; Retrieved from Internet: URL: http://handform.net/gmote-help.php.

Gestman, Mouse Gesture Manager for Windows, SeveruSoft, Retrieved from Internet on Aug. 23, 2010; Retrieved from Internet: URL: http://severusoft.com/gestman.html.

HighSign—Increase Productivity Using Mouse Gestures, Retrieved from Internet on Aug. 23, 2010; Retrieved from Internet: URL: http://highsign.codeplex.com/.

Mouse Gestures, Redox, Home, Retrieved from Internet on Aug. 23, 2010; Retrieved from Internet: URL: http://www.mousegestures.org/.

Quicksilver 1.0 b58, Softonic, Retrieved from Internet on Aug. 23, 2010; Retrieved from Internet: URL: http://quicksilver.en.softonic.com/mac.

Strokelt—Mouse Gestures for Windows, Retrieved from Internet on Aug. 23, 2010; Retrieved from Internet: URL: http://www.tcbmi.com/strokeit/.

Armitage, R., Review Sensiva, ATPM 6.11, Retrieved from Internet on Jun. 18, 2010; Retrieved from Internet: URL: http://www.atpm.com/6.11/sensiva.shtml.

Review: Sensiva Symbol Commander, InfoSync, http://www.infosyncworld.com/reviews/n/2404.html.

PDA Cortex, Symbol Commander Software now available on Pocket PC, Retrieved from Internet on Jun. 18, 2010; Retrieved from Internet: URL: http://www.pdacortex.com/symbol.htm.

Symbol Commander Pro Help files, Sensiva, Inc. , Retrieved Nov. 11, 2002.

Vivi Mouse Aid—Advanced Mouse Gestures, Retrieved from Internet on Aug. 23, 2010; Retrieved from Internet: URL: http://www.vivisoftware.com/vivi_mouseaid.htm.

Download Symbol Commander Shareware Software, TUCOWS, Retrieved from Internet on Sep. 27, 2010; Retrieved from Internet: URL: http://www.tucows.com/preview/258173.

International Search Report, PCT/US2010/058377, mailed Aug. 30, 2011.

Japan Patent Office, Notice of Reasons for Rejection in Japanese Patent Application No. P2012-544573, mailed Oct. 14, 2014.

Office Action issued in counterpart CN201080064172.5, filed on Nov. 30, 2010, (14 pages).

English Translation of Chinese Office Action inssued in counterpart CN201080064172.5, filed on Nov. 30, 2010. (28 pages).

European Search Report issued in corresponding European Patent Application No. 10838108.8, dated Dec. 9, 2015. (8 pages).

Office Action issued in related U.S Appl. No. 12/836,397, issued May 19, 2016 (34 pages).

Office Action issued in counterpart CN201080064172.5, filed on Nov. 30, 2010, (42 pages).

* cited by examiner

| Example gestures and actions | | |
|---|---|---|
| △ | upper-case "A" | • amazon.com |
| B | upper-case "B" | • bing.com<br>• baidu.com |
| C | upper-case "C" | • open control panel |
| D | upper-case "D" | • dell.com |
| E | upper-case "E" | • eBay.com |
| F | upper-case "F" | • facebook.com |
| G | upper-case "G" | • google.com<br>• open gmail |
| H | upper-case "H" | • hp.com |
| I | upper-case "I" | • (see "stroke down" entry in this table) |
| J | upper-case "J" | • Order item highlighted |
| K | upper-case "K" | • Pre-fill form |
| L | upper-case "L" | • lenovo.com |
| M | upper-case "M" | • msn.com<br>• Launch media application (e.g. music player)<br>• Play music |
| N | upper-case "N" | • Display news or go to news site<br>• Netflix.com |

| Example gestures and actions | | |
|---|---|---|
| O | upper-case "O" | • Launch MICROSOFT OUTLOOK<br>• Launch photo software or photo web site |
| P | upper-case "P" | • Launch or photo application<br>• Launch MICROSOFT POWERPOINT |
| Q | upper-case "Q" | • Quit program (e.g. close program) |
| R | upper-case "R" | • Replay media |
| S | upper-case "S" (sans serif) | • finance web site<br>• sony.com |
| S | upper-case "S" (serif) | |
| T | upper-case "T" | • toshiba.com<br>• turn on tea pot (e.g. via direct or remote control). This is an example of phonetic matching) |
| U | upper-case "U" | • youtube.com (this is an example of phonetic matching) |
| V | upper-case "V" | • Launch video application (e.g. video player) |
| W | upper-case "W" | • Open Amazon.com's Wish List |

FIG. 24

| Example gestures and actions | | |
|---|---|---|
| ✗ | upper-case "X" | • Exit Window<br>• Close Window<br>• Quit |
| Z | upper-case "Z" | • zappos.com |
| α | lower-case "a" | • amazon.com or yahoo answers |
| b | lower-case "b" | • Go to banking website |
| c | lower-case "c" | • Open control panel |
| d | lower-case "d" | • Launch DVD application (e.g. DVD player)<br>• Play DVD |
| e | lower-case "e" | • Run GOOGLE Earth |
| f | lower-case "f" | • Flickr.com |
| g | lower-case "g" | • igoogle.com |
| h | lower-case "h" | • Hulu.com |
| i | lower-case "i" | • Launch iTunes program |
| j | lower-case "j" | • Go to jobs web site |
| k | lower-case "k" | • Go to kid-friendly site |
| l | lower-case "l" | • LinkedIn.com |
| m | lower-case "m" | • Launch MICROSOFT MEDIA CENTER or other media software |
| n | lower-case "n" | • Launch Notepad.exe |

| Example gestures and actions | | |
|---|---|---|
| o | lower-case "o" | • Launch MICROSOFT OUTLOOK or other email software |
| p | lower-case "p" | • Launch MICROSOFT POWERPOINT or other presentation software |
| q | lower-case "q" | • Obtain stock quote |
| r | lower-case "r" | • Research (e.g. visit website such as Wikipedia) |
| s | lower-case "s" | • Launch symbol recognition application<br>• uscrybe.com |
| t | lower-case "t" | • Launch iTunes software |
| u | lower-case "u" | • Undo last action |
| v | lower-case "v" | • Video site |
| w | lower-case "w" | • Launch MICROSOFT WORD or other word processing software |
| x | lower-case "x" | • Launch MICROSOFT EXCEL or other spreadsheet software |
| y | lower-case "y" | • Yahoo.com<br>• Answer "yes" |
| z | lower-case "z" | • Launch "Zorro" game |

FIG. 25

| Example gestures and actions | | |
|---|---|---|
| △ | Triangle, point up | Select all (e.g. all text in active window) |
| ▽ | Triangle, point down | |
| ⌑ | Tee Loop | Copy (e.g. selected item)<br>Cut<br>Open control panel (e.g. Scrybe control panel) |
| ⌑ | Ell Loop | |
| ⌖ | Spiral Loop | |
| ⌐ | Bottom right square corner | Cut (e.g. selected item) |
| ∧ | Caret | Paste (e.g. into active window) |
| → | Stroke right | Forward (e.g. browser forward fast forward media being played skip to next media item etc.)<br>Select all<br>Repeat |
| ← | Stroke left | Back (e.g. browser back reverse media being played skip to previous media item etc.)<br>Cut<br>Undo |
| ↗ | Stroke upper-right | Maximize Window (e.g. to fill screen) |
| ↙ | Stroke bottom-left | Restore Window |

| Example gestures and actions | | |
|---|---|---|
| ⌐ | Upper right square corner | Minimize Window<br>Back |
| ↑ | Stroke up | Start (e.g. start replay of media)<br>Copy |
| ↓ | Stroke down | Stop (e.g. stop media being played)<br>Paste |
| ⌞ | Bottom left square corner | Undo<br>Copy |
| ⌜ | Upper left square corner | Forward |
| @ | At symbol | Check email<br>Launch default mail program or appropriate email website (Perhaps directly to compose new outgoing mail. If an email address is highlighted may automatically address the email.) |
| ? | Question mark | Open "help"<br>Conduct a directed search of highlighted text (e.g. on desktop or via the web) |
| $ | Dollar sign | finance web site |

FIG. 26

METHOD AND APPARATUS FOR OPERATING IN POINTING AND ENHANCED GESTURING MODES

PRIORITY DATA

This application claims priority to U.S. Provisional Patent Application No. 61/288,109, which was filed on Dec. 18, 2009, U.S. Provisional Patent Application No. 61/311,040, which was filed on Mar. 5, 2010, U.S. Provisional Patent Application No. 61/352,712, which was filed on Jun. 8, 2010, and U.S. Non-Provisional patent application Ser. No. 12/836,397 which was filed on Jul. 14, 2010, all of which are incorporated herein by reference.

FIELD OF THE INVENTION

This invention generally relates to electronic devices

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

There is a continuing need for improvements in input devices.

SUMMARY

A method for operating an electronic system comprising a sensor device configured to detect object motion in a sensing region is disclosed. The method comprises: operating in a pointing mode, operating in an enhanced gesturing mode, and producing an action. While in the pointing mode, the electronic system is configured to recognize a type of sliding input in the sensing region as a type of pointing command. While in the enhanced gesturing mode, the electronic system is configured to recognize the type of sliding input in the sensing region as a gesture command. The gesture command is selectively associated with an action based on a locality of the electronic system. The action is produced in response to recognizing a sliding input as the gesture command.

A method for operating an electronic system comprising a sensor device configured to detect object motion in a sensing region is disclosed. The method comprises: operating in a pointing mode, changing from operating in the pointing mode to operating in an enhanced gesturing mode, and presenting an overlay in a visual display of a display screen when operating in the enhanced gesturing mode. While operating in the pointing mode, the electronic system is configured to recognize a plurality of types of sliding input in the sensing region as pointing commands. The pointing commands may be for interacting with the visual display. While in the enhanced gesturing mode, the electronic system is configured to recognize the plurality of types of sliding input as a plurality of gesture commands associated with a plurality of different gesture actions. The overlay presents information content independent of recognizing the plurality of types of sliding inputs as the plurality of gesture commands.

A method for operating an electronic system comprising a sensor device configured to detect object motion in a sensing region and a display screen configured to provide a visual display is disclosed. The method comprises: operating in a pointing mode, operating in an enhanced gesturing mode, providing a visual representation of a path of a sliding input received while in the enhanced gesturing mode, and changing an appearance of the visual representation in response to recognizing the sliding input as a gesture command. While operating in a pointing mode, the electronic system is configured to recognize a plurality of types of sliding input in the sensing region as pointing commands for interacting with the visual display while in the pointing mode. While operating in an enhanced gesturing mode, the electronic system is configured to recognize the plurality of types of sliding input as a plurality of gesture commands associated with a plurality of gesture actions while in the enhanced gesturing mode.

BRIEF DESCRIPTION OF DRAWINGS

The preferred exemplary embodiment of the present invention will hereinafter be described in conjunction with the appended drawings, where like designations denote like elements, and:

FIGS. 24-26 are tables showing example gesture commands and example actions.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate improved usability.

Figure 1:
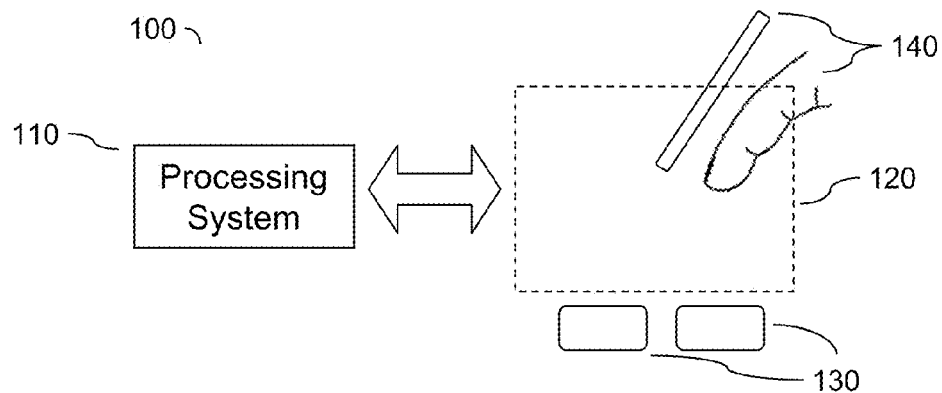
FIG. 1 is a block diagram of an exemplary input device, in accordance with embodiments of the invention.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" and "transmitters") and one or more receiver sensor electrodes (also "receiver electrodes" and "receivers". Transmitter sensor electrodes may be modulated relative to a reference voltage (e.g., system ground) to transmit transmitter signals, and receiver sensor electrodes may be held substantially constant relative to the reference voltage to facilitate receipt of resulting signals corresponding to the transmitter signals. Sensor electrodes may be dedicated transmitters or receivers, or may be configured to both transmit and receive.

In FIG. 1, a processing system (or "processor") 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components; in some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes. Additional example actions include GUI actions such as cursor movement, selection, menu navigation, launching particular applications (such as games, web browsers, or any other application), and controlling particular applications (such as directing the play of media, visiting particular web sites, performing directed searches on the web, sharing multiple photos at a web site with one gesture, and the like).

In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

The following discussion often expressly refers to the processing system 110. However, it should be understood that such discussion is also applicable to systems other than the processing system 110. That is, systems other than the processing system 110 may implement the configurations and methods discussed either alone, with each other, or in conjunction with the processing system 110, and the like. Example other systems include the input device 100 and other processing systems (e.g. processing systems of associated electronic systems, if such processing systems exist and are separate from their associated processing systems 110).

For example, if a method outlined below expressly refers to the processing system 110, an electronic system with the processing system 110 and a central processing system separate from the processing system 110 may perform part or all of the method using the central processing system. Any remaining parts of the method may be performed by the processing system 110, or by some other part of the electronic system.

Figure 2:
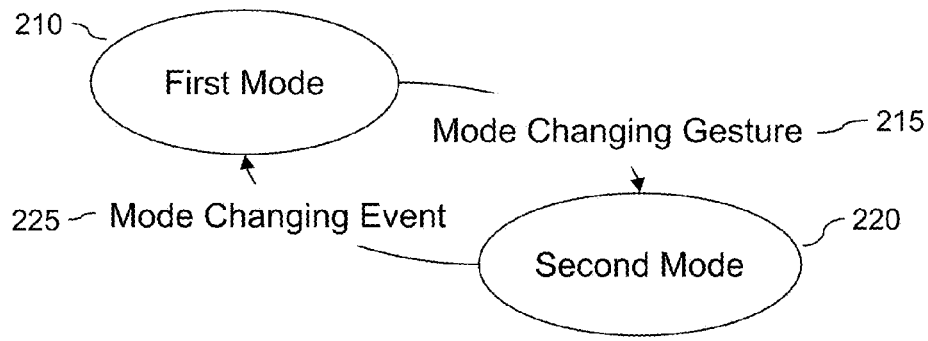
FIGS. 2-3 are state diagrams showing potential operation of the exemplary input device of FIG. 1, in accordance with embodiments of the invention.

FIG. 2 is a state diagram showing potential operation of the input device 100 of FIG. 1. FIG. 2 shows states as circles, and transitions in state are shown as arrows connecting the circles. Events causing the transitions are labeled next to their associated transitions. The processing system 110 is configured to operate in a first mode 210 and a second mode 220. In response to recognizing a characteristic object motion in the sensing region 120 as a Mode Changing Gesture 215 (e.g. an "Activation Gesture"), the processing system 110 changes from operating in the first mode 210 to operating in the second mode 220.

A sliding input comprises object motion (motion of one or more objects) with some amount of lateral movement. The sliding input may further comprise object motion with little or no lateral movement. For example, in some embodiments comprising an input surface contactable by the input objects 140 providing sliding input in the sensing region 120, sliding inputs comprise motion with components parallel to the input surface that are greater than a motion threshold. These sliding inputs may further comprise motion with components perpendicular to the input surface.

Sliding inputs recognized as pointing commands trigger one or more pointing actions, and are used to facilitate navigation and selection. Pointing actions move arrows, cursors, pointers, icons, highlighters, and the like across or through desktop images, menus, and other user interface components.

In some embodiments, the first mode 210 is a "Pointing Mode" and the second mode 220 is an "Enhanced Gesturing Mode." When operating in the Pointing Mode, the processing system 110 recognizes a first type of sliding input in the sensing region 120 as a first pointing command. That is, if the first type of sliding input is provided in the sensing region 120 when the processing system 110 is operating in the Pointing Mode, the processing system 110 treats the first type of sliding input as a pointing command. In contrast, when operating in the Enhanced Gesturing Mode, the processing system 110 recognizes the first type of sliding input as a first gesture command of a plurality of gesture commands that it recognizes in the Enhanced Gesturing Mode; this plurality of gesture commands is associated with a plurality of different gesture actions. That is, if the first type of sliding input is provided in the sensing region 120 when the processing system 110 is operating in the Enhanced Gesturing Mode, the processing system 110 treats the first type of sliding input as a gesture command instead of a pointing command. Thus, the first type of sliding input performed in the Pointing Mode causes a different outcome than the first type of sliding input performed in the Enhanced Gesturing Mode. For example, the first type of sliding input may have a "C" shape. This first type of sliding input may cause a cursor to move along a "C"-shaped path on a display in the Pointing Mode, and may cause an active application to close in the Enhanced Gesturing Mode.

In some embodiments, the processing system 110 further recognizes a second type of sliding input in the sensing region 120 as a second pointing command when operating in the Pointing Mode. The processing system 110 recognizes the second type of sliding input in the sensing region 120 as a second gesture command. The second gesture command is of the plurality of gesture commands that it recognizes in the Enhanced Gesturing Mode. The second gesture command is associated with a gesture action different from the gesture action associated with the first gesture commands. For example, the second type of sliding input may be a linear stroke beginning in a lower left portion and ending in an upper right portion of the sensing region 120. This second type of sliding input may cause the cursor to move toward the upper right on the display in the Pointing Mode, and may maximize or restore a display window in the Enhanced Gesturing Mode.

In various embodiments, the processing system 110 may recognize three, four, or more types of sliding inputs in the sensing region as pointing commands in the Pointing Mode and gesture commands in the Enhanced Gesturing Mode. These gesture commands may be associated with the same or different gesture actions.

Additional examples of gesture commands include: two finger rotate for changing the orientation of an image; multiple-finger (e.g. two, three, four fingers) strokes to the left, right, up, or down, for application switching or for media controls (e.g. play/pause, stop, next, previous); two-finger pinch or spread for zoom level adjustment; one-finger (or multi-finger) circular motion for scrolling; three-finger pinch or spread for cut, copy, and paste; and three-finger diagonal stroke for restoring a window.

Gesture commands can also be strung together in time to produce actions different from that of the individual gesture commands. For example, in some embodiments, a three-finger pinch indicates copy, and a three-finger diagonal upward stroke causes a window to maximize in size. A combination of a three-finger pinch followed by a three-finger diagonal upward stroke may share the selected item(s), such as by changing the security access of the item(s) or by posting them to a web site.

In some embodiments, certain gesture commands are associated with actions involving private or public networks, such as the Internet. In such a case, the processing system may attach an identifier (e.g. a tag or "license plate") to any information sent to elsewhere on the network. For example, where the action involves communications with a web site, an identifier may be added to information sent to the web site. In some embodiments, users may specify which identifier to use, when to use identifiers (or not to use them), and the like.

In some embodiments, one or more gesture commands are associated with actions for performing directed searches on local files, remote files, or on the Internet. For example, the search may involve dictionaries, thesauruses, encyclopedias, file names, search engines, online stores, web site such as wikis and social media sites, etc.). In such a case, the processing system 110 may also gather search term(s) from one or more sources (such as active applications) and prepare the search term(s) for the search tool as needed. For example, search terms may comprise text selected in an email message, a locally-stored document, a web page, or the like. The selection of text may occur before or after an input is recognized as a gesture command for searching. For example, search terms may comprise text entered in a window presented by the processing system before or after a gesture command for search is recognized. The window may comprise an overlay associated with the Enhanced Gesture Mode.

Various embodiments may support different sets of gesture commands. These sets may be defined by default and later changed. For example, changes may be implemented by updates pushed from an update server, by an application not associated with operation in the Enhanced Gesturing Mode, and by users. When a user defines a new gesture command, the newly defined gesture command may or may not be shown in a list presented by the processing system 110.

Further, the processing system 110 may make different subsets of the gesture commands active, depending on factors such as context of use. For example, gesture commands associated with browsing the World Wide Web may not be recognized or responded to when there is no access to the Internet.

Turning now to FIGS. 24-26, a plurality of example gesture commands and example actions that may be implemented in various systems and methods are illustrated. For example, a system may be implemented such that a user motioning an "upper case 'X'" in the sensing region will generate an "Exit Window" action. As a second example, a user motioning a "lower case 'b'" in the sensing region will generate an action of going to a banking website.

As shown by FIGS. 24-26, gesture commands may be entirely new, or based on existing symbols. For example, gesture commands may emulate alphanumeric characters, mathematics symbols, other characters such as"?", ">", "^", "@", shapes such as boxes and triangles, alphabets and phonetic alphabets, ideographic characters of ideographic languages, etc. Gesture commands may also be phonetically associated with actions.

Although the example gesture commands of FIGS. 24-26 are shown as associated with particular actions, the gesture commands may be associated with other actions (instead of or in addition to the example actions shown). These associations may or may not be user defined. Similarly, the example actions shown in FIGS. 24-26 may be associated with other gesture commands (instead of or in addition to the gesture commands shown). Further, in various embodiments, the Enhanced Gesturing Mode may include none, some, or all of these examples. Where web sites are listed in the table as example actions, the action may be to navigate to the web site (e.g. in the current window or tab, or in a new window or tab), or to launch a web browser and navigate to the web site, as appropriate.

The Pointing Mode is directed primarily towards pointing actions, and has at least one type of gesture that is recognized as a pointing command. In various embodiments, a majority of input in the Pointing Mode results in pointing actions. In some embodiments, multiple different types of object motion (e.g. with different lengths, path directions, shapes, timing and the like) are associated with the same type of pointing command (e.g. cursor motion).

The Enhanced Gesturing Mode is directed primarily towards making more actions available to users through gesture commands, and has at least one type of gesture that is recognized as a gesture command. In various embodiments, a majority of input in the Enhanced Gesturing Mode results in gesture actions. In some embodiments, multiple different types of object motion (e.g., with different lengths, path directions, shapes, timing and the like) are associated with the different gesture commands (e.g., the examples described in this document).

Some electronic devices or input devices 100 accept input by multiple input objects 140 (multi-touch) for pointing commands and for gesture commands. With such devices, a mode switch may facilitate distinguishing between pointing and gesture commands. In some embodiments, a mode switch may enable the processing system 110 to support gesture commands that, without the mode switch, it would not support. For example, in some embodiments, the first type of sliding input may be a finger tracing a question mark ("?") on an input surface of the input device 100. This sliding input thus comprises a curved path followed by a tap. In the Pointing Mode, a finger drawing a question mark may cause cursor motion that first curves upwards to the right and then straight downwards (reflecting the curved path), and may also cause a simulated button click (resulting from the tap). In comparison, in the Enhanced Gesturing Mode, a finger drawing a question mark may launch a help dialog or a directed search of highlighted text (e.g. on desktop or via the web). Thus, a mode switch could help differentiate different modes of input operation and desired actions. In some embodiments, with a mode switch to an Enhanced Gesturing Mode, the processing system 110 may be better able to differentiate customized gestures and/or character input from pointing operations.

In some embodiments, the processing system 110 recognizes some inputs as gesture commands in the Pointing Mode. However, the set of gesture commands recognized in the Pointing Mode differs from the set of gesture commands recognized in the Enhanced Gesturing Mode. Thus, an input that is treated as a gesture command in the Pointing Mode may be recognized as a different gesture command in the Enhanced Gesturing Mode.

In some embodiments, as shown in FIG. 2, the processing system 110 changes from operating in the second mode 220 to operating in the first mode 210 in response to a Mode Changing Event 225.

Figure 3:
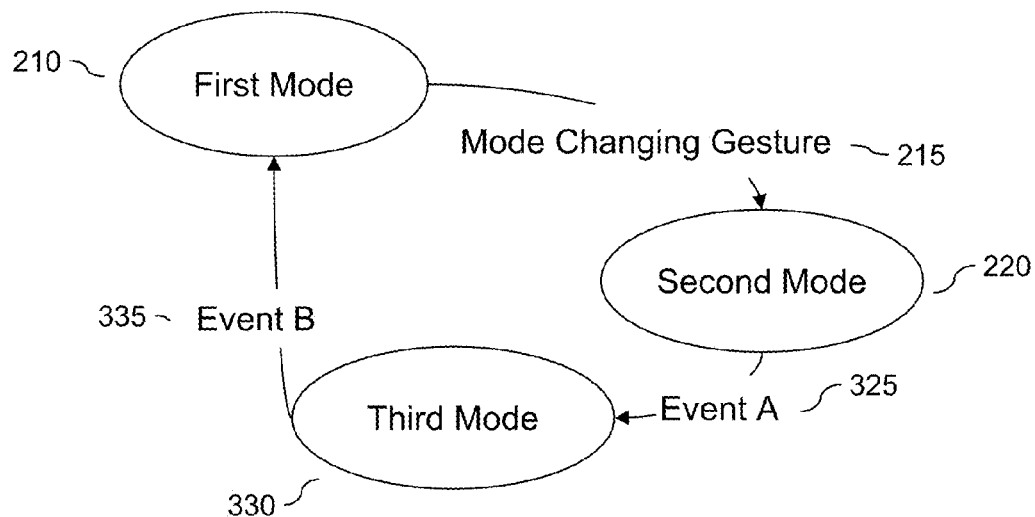

FIG. 3 is also a state diagram showing potential operation of the input device 100 of FIG. 1. FIG. 3 shows an alternate path from the second mode 220 to the first mode 210 for some embodiments. In FIG. 3, the processing system 110 switches from a first mode 210 to a second mode 220 in response to a Mode Changing Gesture 215, from the second mode 220 to a third mode 330 in response to an Event A 325, and from the third mode to the first mode 210 in response to an event B 335.

Although FIG. 2 shows two states (first mode 210 and second mode 220) and two paths (Mode Changing Gesture 215 and Mode Changing Event 225) between them, and although FIG. 3 shows three states with unidirectional paths between each pair of states, various embodiments of the invention can have any number of states and unidirectional or bidirectional paths.

The Mode Changing Gesture 215 may comprise any appropriate characteristic object motion. Some embodiments recognize only one type of characteristic object motion as the Mode Changing Gesture 215, while other embodiments recognize multiple different types of characteristic object motion as the Mode Changing Gesture 215.

Which characteristic object motions are recognized as Mode Changing Gesture(s) 215 may be predefined before the system reaches the end user, defined by the end user, or both. Which characteristic object motions are recognized as Mode Changing Gesture(s) 215 may also be fixed (not changeable by users), or changeable by users. For example, one or more Mode Changing Gestures 215 may be preset by software, and users may be unable to change them. As another example, multiple Mode Changing Gestures 215 may be preset by software or by some entity before the system reaches an end user, and users may be able to select one or more of these multiple Mode Changing Gestures 215 as the one(s) that the users prefer to use. As a further example, users may be able to adjust the Mode Changing Gestures 215 slightly (e.g. change a duration of contact that may be required for input to be recognized as a three-finger tap, the size ranges accepted for particular strokes or other features of a gesture, and the like). As yet another example, users may be able to change or affect these Mode Changing Gestures 215 substantially or define the Mode Changing Gestures 215 entirely.

Figure 4:
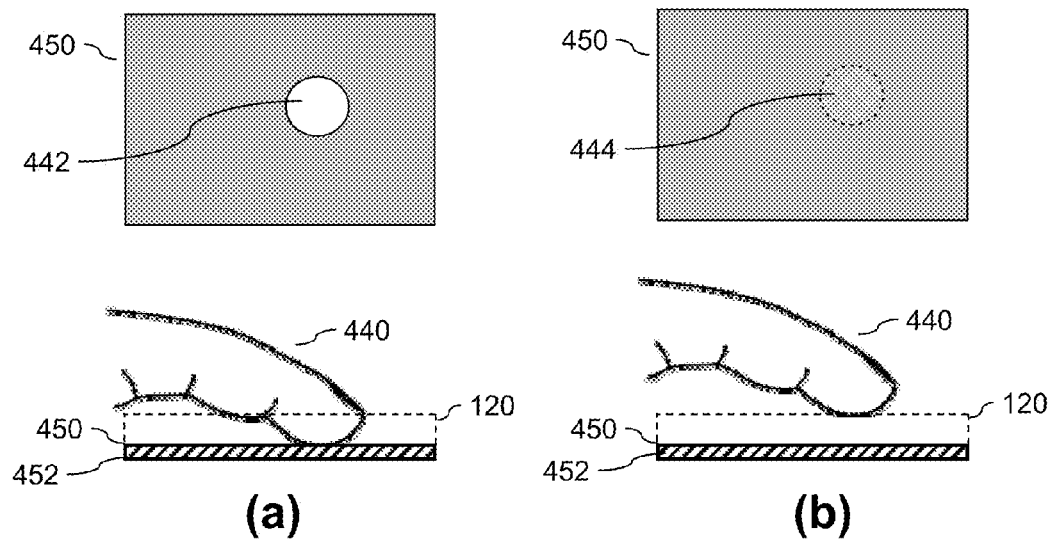
FIGS. 4-6 are top and side/cross-sectional views of example changes in contact state, in accordance with embodiments of the invention.

In some embodiments, the Mode Changing Gesture 215 involves a change in contact state of one or more input objects 140. A change in contact state may comprise changing between contact and no contact. For example, FIG. 4(a) shows a finger 440 in contact with an input surface 450 of a component 452 found in some embodiments of the input device 100. The input surface 450 is configured to be contactable by the finger 440 when it is providing input in the sensing region 120. The component 452 may comprise a sensor substrate on which sensor electrodes are disposed. FIG. 4(a) uses a circle 442 to denote the contact of the finger 440 with the input surface 450.

Moving from FIG. 4(a) to FIG. 4(b), the finger 440 changes in contact state. Specifically, the finger 440 has lifted from the input surface 450, and is no longer in contact with the input surface 450. FIG. 4(b) denotes this non-contact state with a dashed circle 444. (FIG. 4(b) also shows the finger 440 as having exited the sensing region 120, although that may not be the case in some embodiments). FIG. 4(a) and FIG. 4(b) represent changing the contact state of the finger 440 from contact to no contact, (or vice versa).

Figure 5:
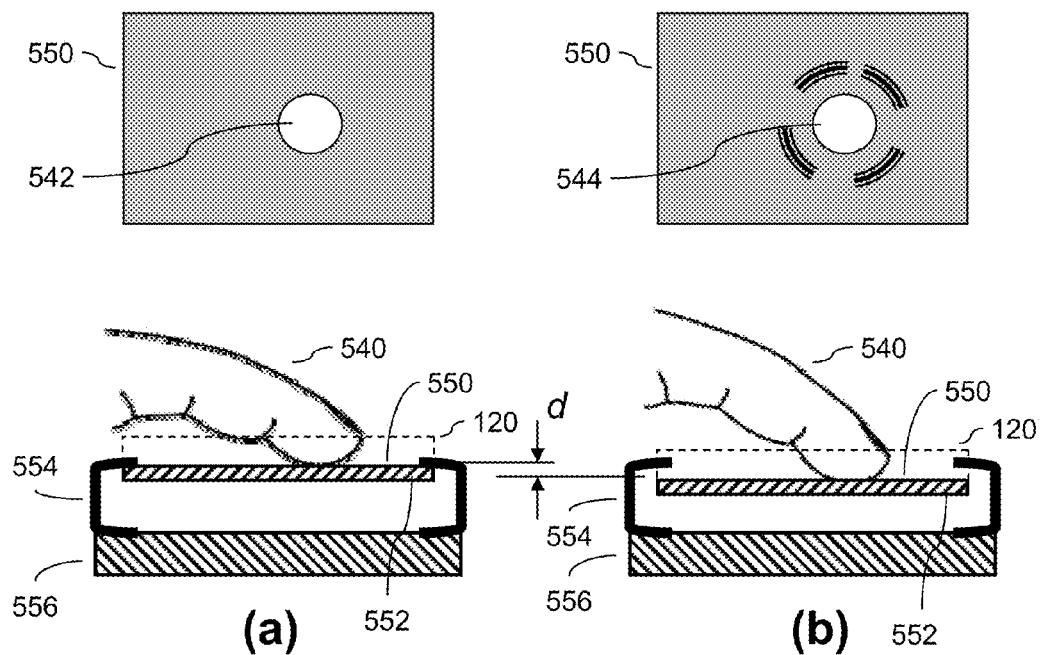

As another example, FIG. 5(a) shows a finger 540 in contact with an input surface 550 of a component 552 found in some embodiments of the input device 100. The component 552 may be moved relative to other parts of the input device 100 (e.g., with respect to a bracket 554 and a base 556). For clarity, the mechanical parts that physically couple the component 552 with the rest of the input device 100 and/or guide the movement of the component 552 are not shown. FIG. 5(a) and FIG. 5(b) represent changing the contact state of the finger 540. Specifically, the finger 540 has pressed on the input surface 550 to a greater extent in FIG. 5(b) than in FIG. 5(a), such that the input surface 550 has depressed by a distance d toward the base 556. FIG. 5(b) denotes the pressed (or pressed further) state with an emphasized circle 544.

In some embodiments, the processing system 110 considers the contact state of the finger 540 to have changed where the distance d is greater than an actuation distance associated with depression or other movement of the input surface 550. In some embodiments, this distance d is associated with the actuation of a switch such as a snap dome or tact switch. For example, some embodiments of the input device 100 comprise a switch configured to be actuated with sufficient movement of the input surface 550. Such embodiments include clickable touch sensors found in various commercial phones and laptops. In such embodiments, determining that a change in contact state occurred may comprise determining actuation of the switch.

FIG. 5(a)-5(b) shows an embodiment where the component 552 translates to accommodate the depression of the input surface 550. In some embodiments, the input surface 550 moves at least partially through deformation or other reconfiguration of the component 552 or other components of the input device 100. As shown in FIGS. 5(a)-5(b) the sensing region 120 also has moved with the input surface 550. However, in some embodiments, the sensing region 120 does not move (or moves insubstantially) with the depression of the input surface 550. Also, in some embodiments, the sensing region 120 changes in shape with movement of the input surface 550.

FIGS. 5(a)-5(b) shows an embodiment where the processing system 110 determines a pressed contact state by detecting movement of the input surface 550. In some embodiments, the processing system 110 determines a pressed contact state at least in part using other characteristics. For example, in some embodiments, the processing system 110 examines the magnitude of change in capacitive coupling(s), the contact area, the shape of contact area, the change in contact area, the force or pressure applied by the finger 540 (individually or in total with other input object(s)), a combination thereof, and the like. These characteristics may be detected by the same sensing element(s) as used to detect input in the sensing region 120 (perhaps even using the same signals received while detecting input in the sensing region 120), by other sensors (including switches), or a combination thereof.

Figure 6:
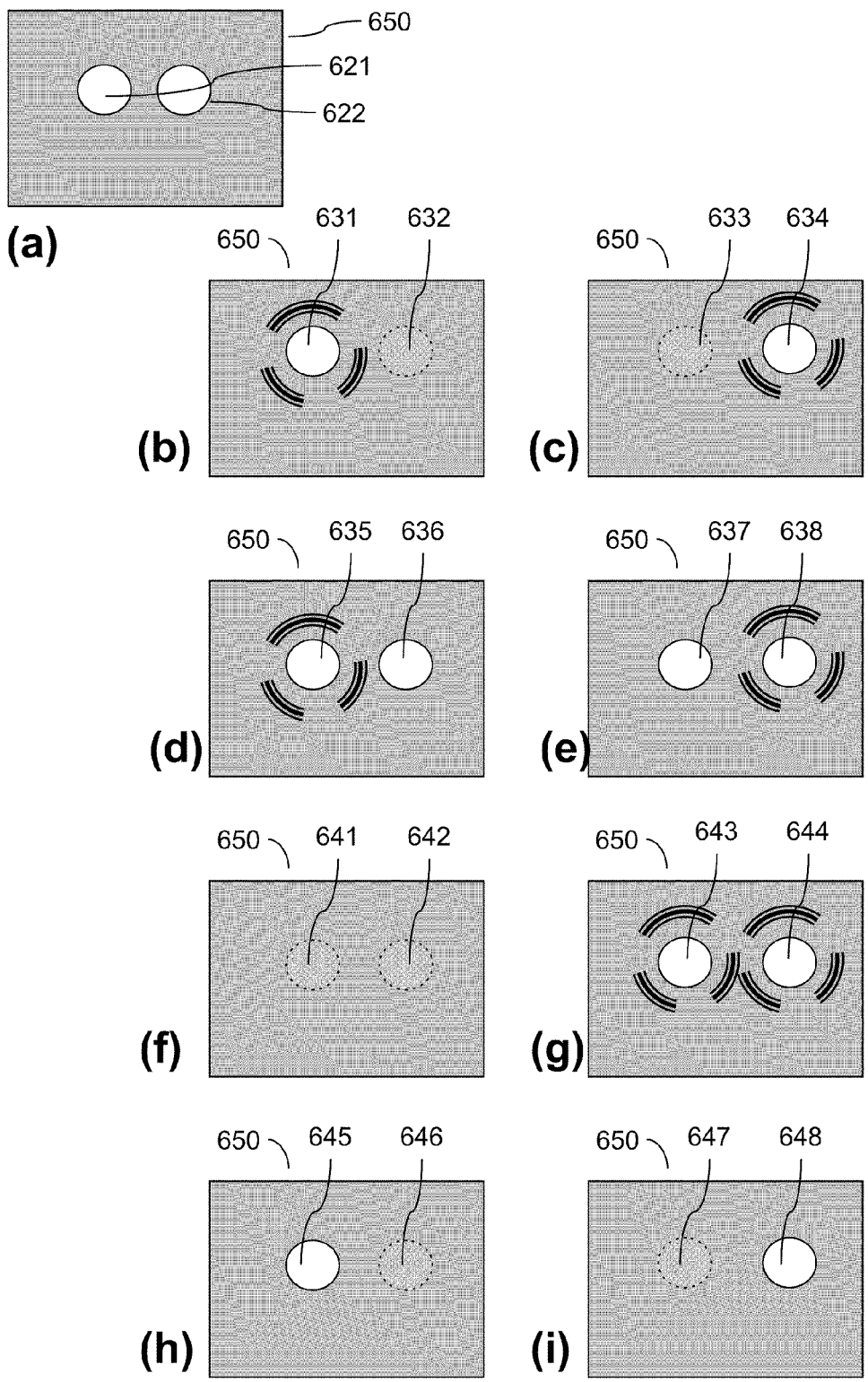

FIGS. 6(a)-(i) show examples of changes in contact state for two input objects on an input surface 650. Specifically, FIG. 6(a) shows a first contact state in which two input objects are in contact with (and not pressing on or pressing harder on) the input surface 650 (denoted by circles 621 and 622). Meanwhile, FIGS. 6(b)-6(i) show some example later contact states for the input objects, assuming no change in the number of input objects. FIGS. 6(b) and 6(c) show one input object in a pressed (or more pressed) state (denoted by emphasized circles 631 and 634) and another input object not in contact with the input surface 650 (denoted by dashed circles 632 and 633). FIGS. 6(d) and 6(e) show one input object in a pressed (or more pressed) state (denoted by emphasized circles 635 and 638) and another input object in contact with the input surface 650 but not in a pressed state (denoted by circles 636 and 637). FIG. 6(f) shows two input objects not in contact with the input surface 650 (denoted by dashed circles 641 and 642). FIG. 6(g) shows two input objects in pressed (or more pressed) states (denoted by emphasized circles 643 and 644). FIGS. 6(h) and 6(i) shows one input object in contact with (and not pressing on or pressing harder on) the input surface 650 (denoted by circles 645 and 648) and another input object not in contact with the input surface 650 (denoted by dashed circles 646 and 647).

FIG. 6(a) in combination with one or more FIGS. 6(b)-(i) shows only some example changes in contact state, and other types of changes in contact state are possible. For example, the starting contact state may be different. As another example, the number of input objects may not be two at both times. In such instances, other permutations are possible.

In some embodiments, recognizing characteristic object motion as the Mode Changing Gesture 215 comprises: determining that the object motion detected in the sensing region 120 comprises a plurality of input objects on an input surface, and determining that at least one of the plurality of input objects on the input surface changes its contact state. In some embodiments, the Mode Changing Gesture 215 comprises determining that at least one of the plurality of input objects changes its contact state multiple times.

In some embodiments, the processing system 110 recognizes, as the Mode Changing Gesture 215, characteristic object motion comprising multiple input objects contacting an input surface one (or more) times. In recognizing object motion as the Mode Changing Gesture 215, the processing system 110 may also apply various criteria to input characteristics such as duration of time in contact/not in contact, distance from an input surface, force applied, and the like.

Some embodiments recognize multiple taps detected in series as the Mode Changing Gesture 215. For example, some embodiments may consider two, three, four, or more taps by a single input object as the Mode Changing Gesture 215. As another example, in some embodiments, recognizing characteristic object motion as the Mode Changing Gesture 215 comprises determining that a plurality of input objects tap substantially simultaneously on the input surface once (or more times). As a specific example, some embodiments may look for two input objects tapped twice on an input surface, and some embodiments may look for three input objects tapped twice on an input surface. As yet another specific example, some embodiments may look for two input objects tapping an input surface followed by three input objects tapping the input surface, or vice versa. Thus, in various embodiments, the characteristic object motion recognized as Mode Changing Gesture 215 may comprise tapping of any combination of numbers and repetitions of input objects.

Some embodiments place strict requirements on the contemporaneousness of the arrival of the input objects, or the departure of the input objects, or both. Other embodiments do not. For example, some embodiments accept input objects that arrive (or depart) within a specified time period to be "simultaneous." The specified time period may coincide with human perceptive ability, such that typical users do not perceive the arrival or departure times of the input objects to be distinct. In embodiments that specify time periods for both arrival and departure, these time periods may be of the same or different durations.

Some embodiments may monitor for the return of a single input object to the input surface to provide object motion that may be recognized as gesture commands. Some embodiments may monitor for the return of multiple (e.g. two, three, etc.) input objects. Some embodiments are agnostic to the number of returning input objects, and consider the next input provided in the sensing region 120 as a potential gesture command. In some embodiments, there is a time-out, such that input objects for providing the gesture command or the object motion that may be recognized as the gesture command must arrive within a time period (e.g. after the end of the characteristic object motion, after a beginning of the second mode, and the like).

Figure 7:
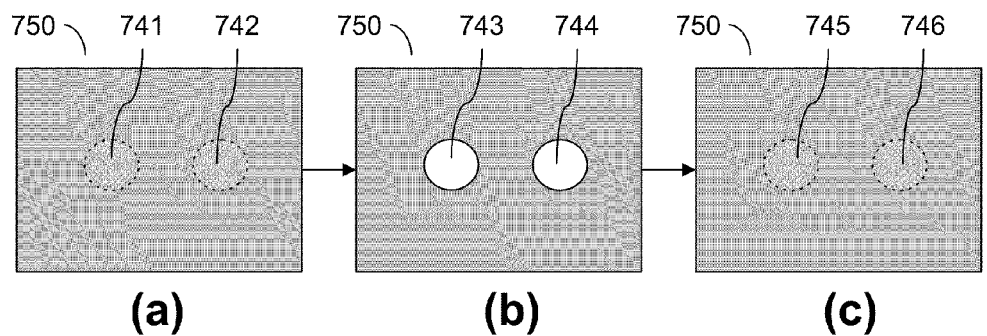
FIGS. 7-11 are top views of example mode changing gestures, in accordance with embodiments of the invention.

FIG. 7 shows two input objects providing such an example characteristic object motion that may be recognized as the Mode Changing Gesture in some embodiments. In FIG. 7(a), two input objects 140 are not in contact with an input surface 750 found in some embodiments of the input device (denoted by dashed circles 741 and 742), although they may be in the sensing region 120. Then, as shown in FIG. 7(b), the input objects are in contact with the input surface 750 (denoted by circles 743 and 744). Then, as shown in FIG. 7(c), the input objects 140 are not in contact with the input surface 750 (denoted by dashed circles 745 and 746). This input sequence may be considered to comprise a single tap by two input objects.

While FIG. 7 shows a tap by two input objects, some embodiments monitor for taps by other numbers of input objects, including two, three, and four input objects. Some embodiments monitor for taps by particular input objects 140, such as a whole hand, perhaps combined with some numbers of fingers.

Also, while FIG. 7 shows two input objects oriented in such a way that they align with a longer edge of the input surface 750, that orientation may or may not be considered by embodiments in determining whether particular input comprises characteristic object motion (that is recognized as a Mode Changing Gesture 215). For example, some embodiments may examine the alignment of the input objects, and require that they be aligned with a longer or a shorter edge of an input surface (or some other feature), while some embodiments may examine the distance between the input objects, the type of the input objects, the orientation of the input objects, and the like. As another example, some embodiments respond similarly, or do not respond differently, to such variations.

Figure 8:
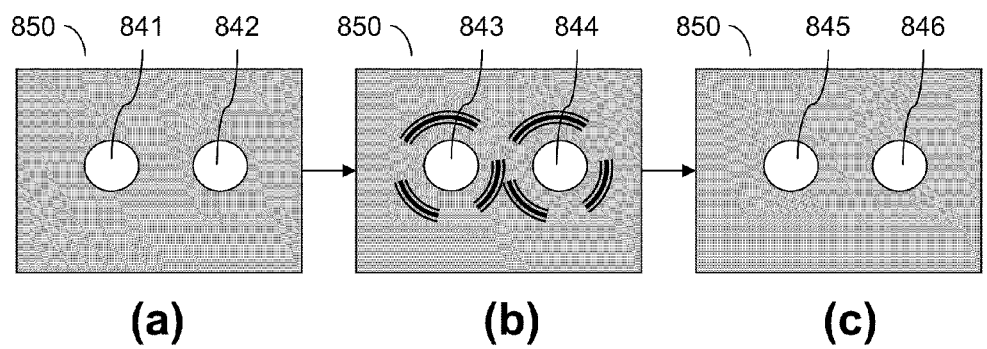

As another example, recognizing characteristic object motion as the Mode Changing Gesture 215 may comprise determining that one or more input objects (of multiple input objects contacting an input surface) substantially simultaneously depress or press harder on the input surface. FIG. 8 shows two input objects providing such a characteristic object motion. In FIG. 8(a), two input objects are in contact with, and not sufficiently pressing, an input surface 850 found in some embodiments of the input device 100 (denoted by circles 841 and 842). Then, as shown in FIG. 8(b), the input objects 140 press on the input surface 850 (denoted by emphasized circles 843 and 844). Then, as shown in FIG. 8(c), the input objects are in contact with, and not pressing, the input surface 850 (denoted by circles 845 and 846).

Figure 9:
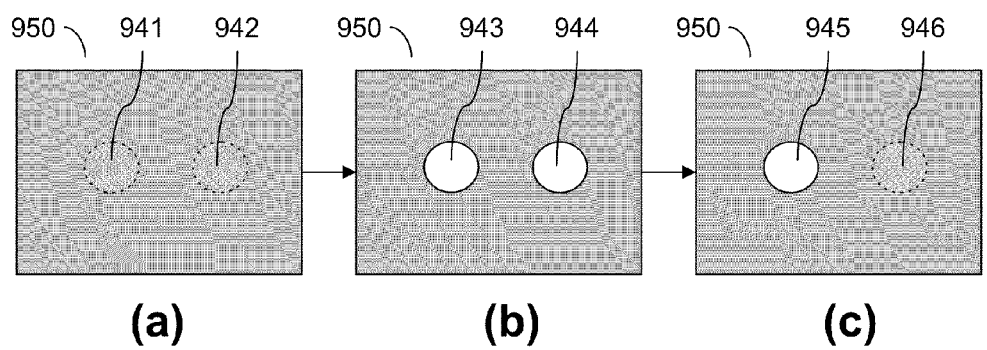

As a further example, in some embodiments, the change in contact state comprises at least one of the plurality of input objects on the input surface (and not all of the plurality of input objects on the input surface) lifting from the input surface. In such embodiments, recognizing characteristic object motion as the Mode Changing Gesture 215 may comprise determining that a first subset of the plurality of input objects previously on an input surface has lifted from the input surface, while a second subset of the plurality of input objects remain on the input surface. The first and second subsets are non-empty, proper subsets of the plurality of input objects, such that each subset contains at least one (and not all) of the input objects of the plurality of input objects. In other words, in such embodiments, recognizing characteristic object motion as the Mode Changing Gesture 215 may comprise determining that at least one of a plurality of input objects previously on an input surface has lifted from the input surface, while at least another one of the plurality of input objects remains on the input surface. FIG. 9 shows two input objects 140 providing such characteristic object motion.

In FIG. 9(a), two input objects are not in contact with an input surface 950 of the input device 100 (denoted by dashed circles 941 and 942), although they may be in the sensing region that extends from the input surface 950. Then, as shown in FIG. 9(b), the input objects are in contact with the input surface 950 (denoted by circles 943 and 944). Then, as shown in FIG. 9(c), one of the input objects is in contact with the input surface 950 (denoted by circle 945) and one of the input objects is not in contact with the input surface 950 (denoted by dashed circle 946).

Figure 10:
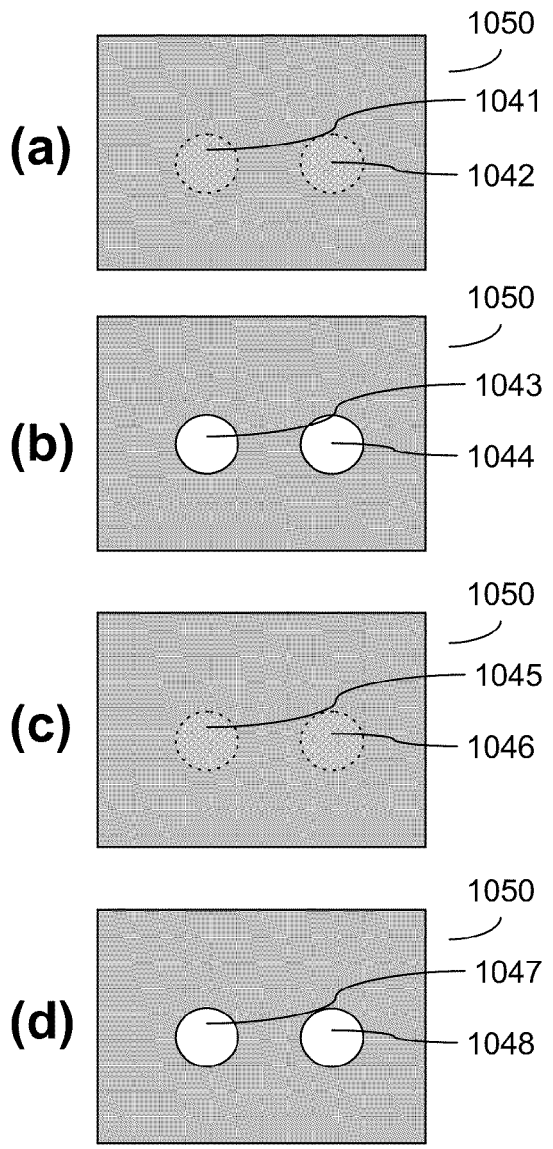

As yet another example, recognizing characteristic object motion as the Mode Changing Gesture 215 may comprise determining that a plurality of input objects substantially simultaneously touches, lifts from, and retouches an input surface. FIG. 10 shows two input objects providing such a sequence. In FIG. 10(a), two input objects are not in contact with an input surface 1050 of the input device 100 (denoted by dashed circles 1041 and 1042), although they may be in the sensing region 120 that extends from the input surface 1050. Then, as shown in FIG. 10(b), the input objects are in contact with the input surface 1050 (denoted by circles 1043 and 1044). Then, as shown in FIG. 10(c), the input objects are not in contact with the input surface 1050 (denoted by dashed circles 1045 and 1046). Then, as shown in FIG. 10(d), the input objects are again in contact with the input surface 1050 (denoted by circles 1047 and 1048).

Figure 11:
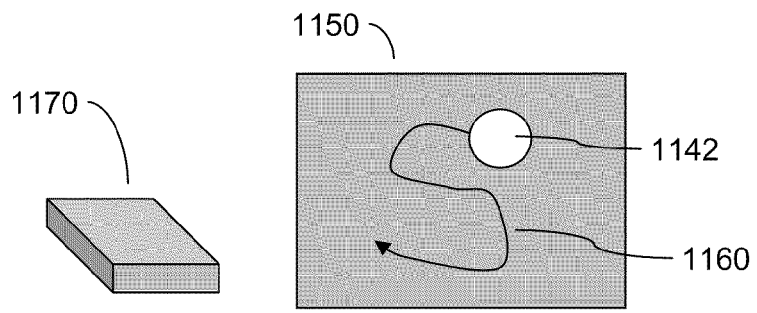

In some embodiments, recognizing the characteristic object motion as the Mode Changing Gesture 215 may comprise detecting that the characteristic object motion occurs substantially simultaneously with actuation of one or more physical function switches, such as buttons or keypad keys. FIG. 11 shows one input object providing an example of such a sequence. In FIG. 11, while a key 1170 is actuated, an input object in contact with an input surface 1150 found in some embodiments of the input device 100 traces out an "S" (denoted by circle 1142 and path 1160).

Some embodiments may recognize the characteristic object motion as the Mode Changing Gesture 215 if it is coupled with the pressing of one or more keys specifically associated with the Mode Changing Gesture 215, the first mode 210, and/or the second mode 220. Some embodiments may monitor for the pressing of multiple keys not specific to the Mode Changing. The keys may be part of or separate from the input device 100.

For example, the input device 100 may be used in conjunction with a standard keyboard, and the characteristic object motion may be recognized as the Mode Changing Gesture 215 if the <shift> and <ctrl> keys are actuated at the same time as the provision of the characteristic object motion. As another example, some embodiments may monitor for the pressing of function keys coupled with characteristic object motion detected by the input device 100 (e.g. <control>-<alt> accompanied by a tap or a traced "S" on an input surface of the input device 100).

Returning now to FIGS. 2-3, the events that cause the processing system 110 to change from the second mode 220 (e.g. the Mode Changing Event 225 or Event A 325) to another mode (e.g. the first mode 210 or the third mode 230) may comprise any of a variety of events. For example, in some embodiments, the processing system 110 is configured to change from operating in the second mode 220 in response to a termination event, such as recognizing a subsequent object motion as a termination command. As used in this document, a "subsequent object motion" occurs in the sensing region 120 at least partially after the characteristic object motion that is recognized as the Mode Changing Gesture 215. The termination event may comprise any appropriate user input (or lack of user input), including any of the alternatives described for the Mode Changing Gesture 215, user input outside of the sensing region 120, and time-outs. In some embodiments with termination events comprising time-outs after an input, additional input causes continued operation in the second mode 220 until a termination event fully occurs. For example, in some embodiments, a termination event comprises a time-out after a removal of input objects from the sensing region 120, and new presences of input objects in the sensing region 120 during the time-out interval resets the time out; this stops the processing system 110 from switching out of the second mode 220 until a time-out after another removal.

In various embodiments, the termination command may be the same as or be different from the characteristic object motion recognized as the Mode Changing Gestures 215 for those embodiments. For example, in some embodiments, the termination command comprises object motions that match the characteristic object motions recognized as Mode Changing Gestures 215 for those embodiments (e.g. both the termination command and the characteristic object motion are three touches of short duration by three input objects). As another example, the termination command may comprise object motion that is similar to, but different from, from the characteristic object motion recognized as Mode Changing Gesture 215 (e.g. both involve two touches of by two input objects, but the Mode Changing Gesture 215 comprises a touch of shorter duration followed by a touch of longer duration, and the termination command comprises a touch of longer duration followed by a touch of shorter duration). As yet another example, the termination command may comprise object motion that is clearly different from the characteristic object motion recognized as the Mode Changing Gesture 215 (e.g. involving different numbers, sequences, motion, and the like, of input objects in the sensing region 120).

As another example, in some embodiments, the processing system 110 is configured to change from operating in the second mode 220 in response to detecting an end of a subsequent object motion. Any appropriate methodology can be applied to determine the end of an object motion, and some examples are highlighted here. In some embodiments, the end of an object motion comprises the input object(s) providing the object motion exiting or being outside of the sensing region 120. In some embodiments, the end of object motion comprises the input object(s) providing the object motion lifting from, sliding out of, or otherwise moving away from an input surface or the sensing region 120 (and not necessarily exiting the sensing region 120). In some embodiments, the end of object motion comprises the input object(s) providing the object motion making a sharp change in position, velocity, and/or acceleration. In some embodiments, the end of object motion comprises the input object(s) providing the object motion staying relatively stationary for more than a reference amount of time. The input object(s) may be considered relatively stationary when they change in position less than a reference amount, when they do not move past a reference distance from a prior position, when they exhibit speeds of less than a reference speed, and the like.

As another example, in some embodiments, the processing system 110 is configured to change from operating in the second mode 220 in response to recognizing a subsequent sliding input as one of a plurality of gesture commands. In some embodiments, recognizing the subsequent sliding input as any of the gesture commands recognized in the second mode 220 would switch the processing system 110 from operating in the second mode 220. In some embodiments, recognizing the subsequent sliding input as one of a particular subset of the gesture commands recognized in the second mode 220 would switch the processing system 110 from operating in the second mode 220.

As yet another example, in some embodiments, the processing system 110 is configured to change from operating in the second mode 220 in response to a passage of a predetermined amount of time. The predetermined amount of time may be referenced from any appropriate reference, such as when the processing system 110 detects the characteristic object motion that is recognized as the Mode Changing Gesture 215, when the processing system 110 recognizes the characteristic object motion as the Mode Changing Gesture 215, and when the processing system 110 begins operating in the second mode 220, at a beginning, middle, or end of a first sliding input that occurs in the second mode 220. In various embodiments, the predetermined amount of time may be determined at any appropriate time before the start of the passage of the predetermined amount of time. Examples include: at manufacture, at start-up or coming out of a low-power state, at log-in or other security validation, and at changing to the second mode 220. The predetermined amount of time may also be changeable, such as in response to environmental conditions, operating status, user preferences, and input history.

Figure 12:
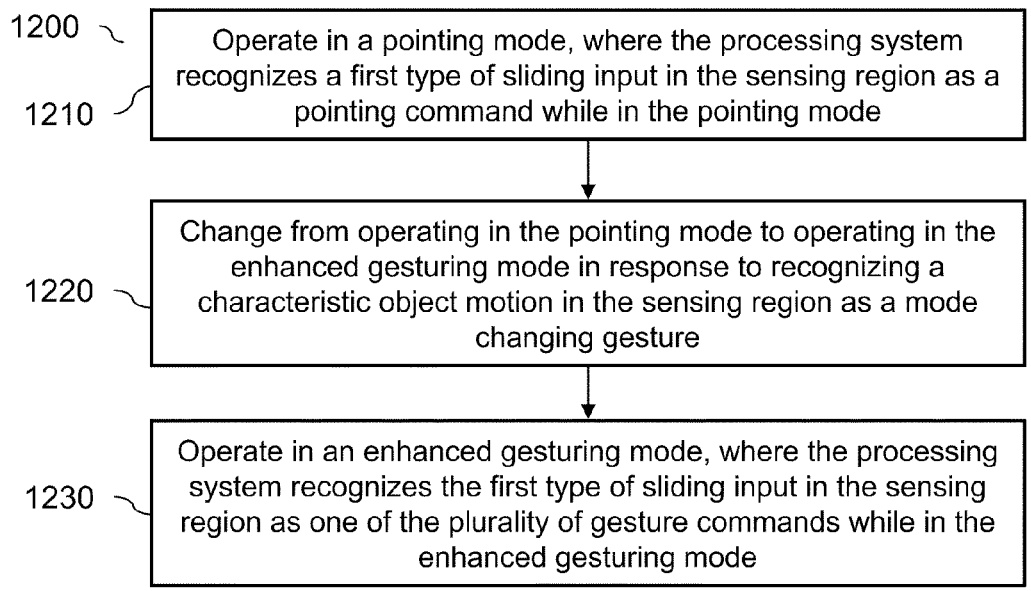
FIGS. 12-14 are flow charts of example methods, in accordance with embodiments of the invention.
Figure 13:
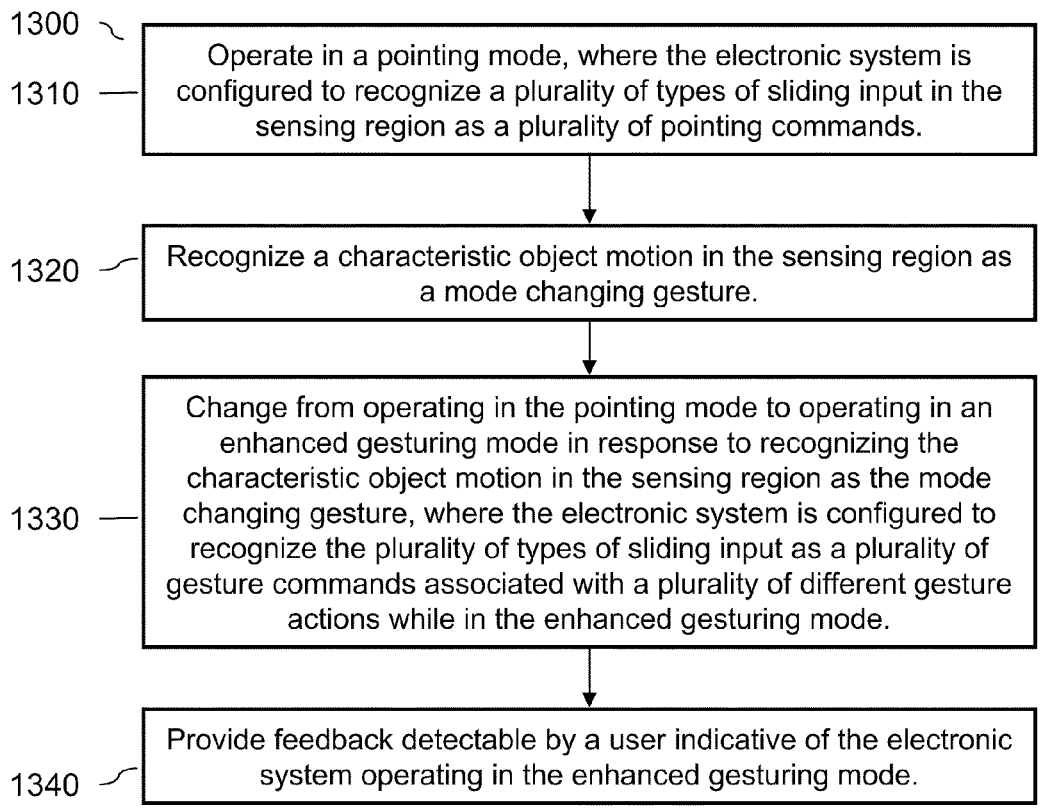
Figure 14:
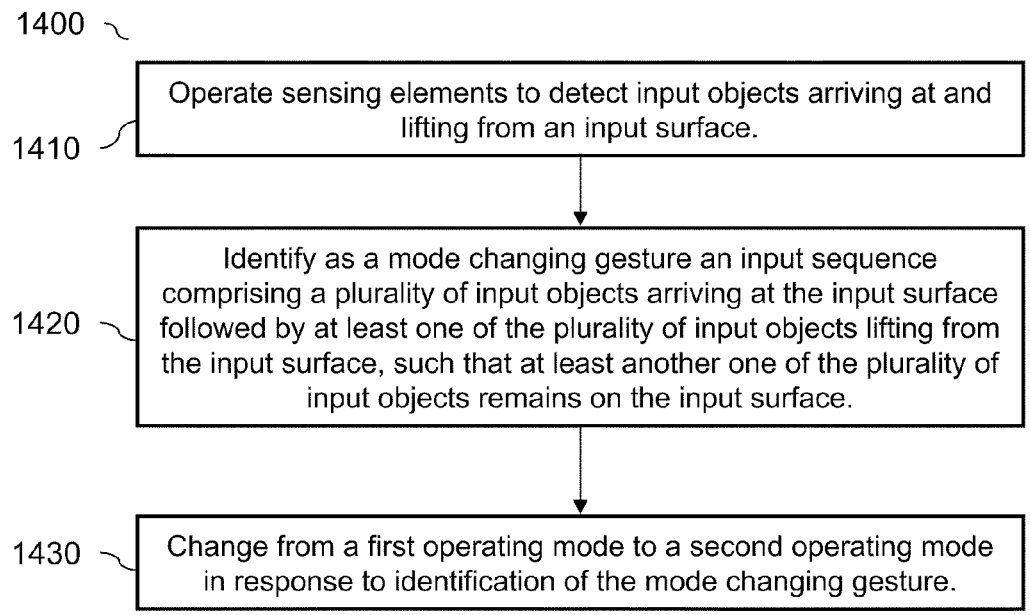

FIGS. 12-14 are flow charts showing exemplary methods of operation of the input device 100 of FIG. 1 configured to operate in multiple modes (such as the modes of FIGS. 2 and 3), in accordance with embodiments of the invention. Although FIGS. 12-14 shows specific steps, some embodiments may have a subset of the steps shown, other steps in addition, or both. Also, although FIGS. 12-14 show a particular ordering of the steps, some embodiments have the same or different steps in different orders. Further, as noted above, although the discussion below often expressly refers to the processing system, the discussion applies to any appropriate system.

In reference to FIG. 12, an example method 1200 in accordance with the invention comprises the following. In a first step 1210, a processing system operates in a Pointing Mode, where the processing system recognizes a first type of sliding input in the sensing region as a pointing command while in the Pointing Mode. In a second step 1220, the processing system changes from operating in the Pointing Mode to operating in an Enhanced Gesturing Mode in response to recognizing a characteristic object motion in the sensing region as a Mode Changing Gesture 215. In a third step 1230, the processing system operates in the Enhanced Gesturing Mode. When operating in the Enhanced Gesturing Mode, the processing system recognizes the first type of sliding input in the sensing region as one of the plurality of gesture commands that it recognizes in the Enhanced Gesturing Mode; the plurality of gesture commands is associated with a plurality of different gesture actions.

FIG. 13 shows an example method 1300 for operating embodiments comprising a display screen, in accordance with the invention. The display screen is configured to provide a visual display in an active area of the display screen. The method 1300 comprises the following. In a first step 1310, an electronic system (or a processing system) operates in a Pointing Mode. While in the Pointing Mode, the electronic system (or the processing system) recognizes a plurality of types of sliding input in the sensing region as pointing commands. The pointing commands may be for interacting with the visual display while in the pointing mode, such as for causing motion of display elements in various directions. In a second step 1320, the electronic system (or the processing system) recognizes a characteristic object motion in the sensing region as a Mode Changing Gesture. In a third step 1330, the electronic system (or the processing system) changes from operating in the Pointing Mode to operating in an Enhanced Gesturing Mode in response to recognizing the characteristic object motion in the sensing region as the Mode Changing Gesture. While in the Enhanced Gesturing Mode, the electronic system (or the processing system) recognizes the plurality of types of sliding input as a plurality of gesture commands associated with a plurality of different gesture actions. In a fourth step 1340, the electronic system (or the processing system) provides feedback detectable by a user indicative of operation in the Enhanced Gesturing Mode. The feedback may comprise visual feedback, aural feedback, tactile feedback, or a combination thereof. Feedback is discussed further below.

FIG. 14 shows an example method 1400 for using embodiments comprising an input surface configured to be contacted by input objects, in accordance with embodiments of the invention. Although discussed specifically in connection with an input device, these steps may also be applied to other devices, such as an electronic system that is integrated with or communicates with the input device. Also, the input device may accomplish these steps via a processing system of the input device. In step 1410, an input device operates its sensing element(s) to detect input objects arriving at and lifting from the input surface. In step 1420, the input device identifies a characteristic object motion as a Mode Changing Gesture. The characteristic object motion comprises a set of input objects arriving at the input surface followed by a first subset of the set of input objects lifting from the input surface, such that a second subset of the set of input objects remains on the input surface. The first and second subsets are both non-empty, proper subsets of the set of input objects that arrived at the input surface. In step 1430, the input device changes from a first operating mode (e.g. first mode 210) to a second operating mode (e.g. second mode 220) in response to identification of the characteristic object motion as the Mode Changing Gesture.

Thus, some embodiments recognize characteristic object motion as the Mode Changing Gesture 215 if it comprises a multitude of input objects (e.g. fingers) being placed on an input surface of an input device, followed by one or more of the input objects lifting from the input surface.

In some embodiments of the method 1400, the input device detects an end to an object motion by detecting that the one (or more) input object has stopped moving for some duration, has moved away from the surface, etc. Time-outs may also be used in some embodiments, such that an action or mode change triggered by the end to the object motion is confirmed and occurs some time after removal.

In some embodiments of the method 1400, the input device accepts a plurality of gesture commands while in the second operating mode, and may perform the following while in the second operating mode (and not while in the first operating mode). The input device may identify subsequent object motion of one (or more) of the second subset of input objects as one of the plurality of gesture commands accepted in the second operating mode.

In some embodiments, the input device changes modes from the second operating mode after all input objects have lifted from the input surface. (e.g. after the remaining input objects have been removed from the surface for a period of time). In embodiments with time-outs, a return of one or more input objects before the time-out may cause a continuation of the second operating mode. In some embodiments, the input device provides an output indicative of the change from the second operating mode.

In some embodiments of the method 1400, the characteristic object motion (that is recognized as the Mode Changing Gesture 215) comprises particular numbers of input objects arriving and lifting from the input surface. For example, the input device may accept M input objects arriving at the input surface and N input objects lifting from the input surface, where M minus N is one (so the number of input objects lifting from the input surface is one fewer than the plurality of input objects arriving at the input surface), is two (so the number of input objects lifting from the input surface is two fewer than the plurality of input objects arriving at the input surface), and the like. As an example with specific numbers, M may be 3, and N may be 2, such that M minus N is one. As another example with specific numbers, some embodiments recognize that a user has placed two input objects down simultaneously on an input surface, and then lifted one.

As another example, the input device may accept N input objects arriving at the input surface followed by one input object lifting (resulting in one fewer than N input objects remaining on the input surface).

The methods 1200, 1300, or 1400 may further comprise any number of additional steps. For example, some methods further comprise providing one or more outputs indicative of a change in operating mode (e.g. from the first operating mode to the second operating mode, from the second operating mode to another mode, etc.). Such outputs may indicate the mode change to other systems, provide feedback to the user about the operational mode (e.g. the first mode 210, the second mode 220, etc.), or both.

As yet another example, some methods further comprise moving a graphical element on a visual display in response to recognizing a first type of sliding input in the sensing region as a pointing command.

Figure 15:
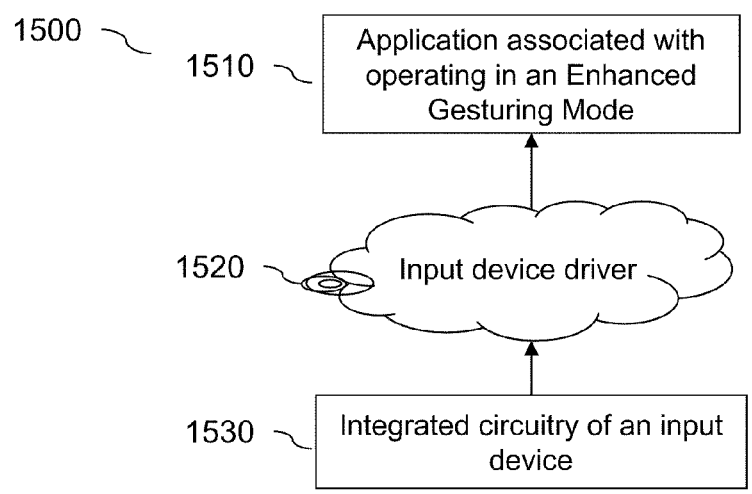
FIG. 15 is a block diagram of an example processing system, in accordance with embodiments of the invention.

FIG. 15 shows an example processing system 1500 for some embodiments. The processing system 1500 includes integrated circuitry 1530 of an input device. The integrated circuitry 1530 may comprise one or more ASICs programmed with appropriate firmware. Input to the input device is detected and communicated by the integrated circuitry 1530 to an input device driver 1520. Information about the input may be communicated as positional or other gestural information. The input device driver is a software application, and provides the information about the input (in modified or unmodified form) to an Enhanced Gesturing Mode application 1510. The Enhanced Gesturing Mode application 1510 is a software application associated with operating in an Enhanced Gesturing Mode. The Enhanced Gesturing Mode application 1510, using the information about the input, attempts to recognize the input as a gesture command. Where the Enhanced Gesturing Mode application 1510 recognizes a gesture command, the Enhanced Gesturing Mode application 1510 causes the associated action(s) to occur. For example, the Enhanced Gesturing Mode application 1510 may interact with other software applications, web sites, output devices, etc.

The processing system 1500 is an example, and other example may include more or fewer components, or entirely different components. For example, various embodiments may lack an explicit driver software application, have a single software application that provides both driver software and Enhanced Gesturing Mode application functionalities, and the like.

Gesture commands and actions may be associated on a one-to-one, many-to-one, or one-to-many basis. Where multiple actions are associated with the same gesture command, one or more actions may result. Where only one or some of the associated actions result, which action(s) result may be arbitrated by context or other appropriate criteria.

For example, a search gesture command may be associated with an action to search using a default search engine, or multiple actions to search on multiple search engines. In such a case, which action(s) is triggered may be based on external information. Example external information includes context of use, which entity manufactured or sold an electronic system operating the symbol recognition and search engine, which Internet service provider is operating with the electronic system (if the action is associated with the Internet), a locality of the electronic system, etc. As a specific example, a search action may be directed to a first search site when the locality is a first geographic location (e.g. N. America or the United States), to a second search site when the locality is a second geographic location (e.g. Asia or China), to a third search site when the locality is a third geographic location (e.g. Europe or Germany). Localities may be arbitrarily defined, and need not conform to any physical boundaries (e.g. continents) or political ones (e.g. nations). The association of localities to search sites may be arbitrary, due to some ranking of fit of the search site to systems having that locality, due to particular agreements with entities associated with that locality, or due to some other reason.

The locality may be the instantaneous location of an associated electronic system, and change as the electronic system moves around. The locality may indicate where the processing system, the input device, or electronic system was localized as part of intended or actual: manufacture, sale, activation, etc. In such static cases, the locality might not correspond to the actual physical location when the symbol is recognized or the action performed. As a specific example, a first search site may be used for all systems intended to be imported into Japan, a second search site may be used for all systems intended to be imported into Korea, and a third search site may be used for all systems intended to be imported into Taiwan.

A processing system, touch sensor device, or electronic system may also have multiple localities that correspond to different actions or work together to identify which actions are performed in a particular instance. For example, a first locality based on location of sale may define a set of preferred web sites, and a second locality based on the instantaneous location may define which one(s) of that set of preferred web sites is navigated to in respond to an associated gesture command.

Non-instantaneous locality information may be burnt into hardware, or it may be changeably stored in memory. For example, locality information may be stored in non-volatile memory. As another example, locality information may be stored in BIOS or registry values.

Some embodiments may have default actions where the action would be based on the locality, but the locality is indeterminate.

Various embodiments may also authenticate locality information. That is, various embodiments may determine the authenticity of information about the locality. Authentication may be accomplished in various ways, and authentication can help prevent unauthorized changes to locality information.

Thus, some embodiments comprise an electronic system that comprises a sensor device configured to detect object motion in a sensing region of the sensor device. The embodiments is configured to operate in a pointing mode, where the electronic system is configured to recognize a type of sliding input in the sensing region as a type of pointing command while in the pointing mode. This type of pointing command may be for interacting with a visual display of an associated display screen. The embodiments is also configured to operate in an enhanced gesturing mode, where the electronic system is configured to recognize the type of sliding input in the sensing region as a gesture command while in the enhanced gesturing mode. The gesture command is selectively associated with an action based on a locality of the electronic system. The electronic system is further configured to produce the associated action in response to recognizing a sliding input as the gesture command.

Some embodiments may launch applications or display overlays specifically in response to operation in one of the modes. The overlay may be opaque or translucent. The overlay may have an entry window where a visual representation of a path of a sliding input received while in the Enhanced Gesturing Mode is shown. The overlay may also display symbol hints, which show viewers some or all of the gesture commands that the embodiment may recognize. The symbol hints may be graphical, textual, or both. Some embodiments allow users to control if, when, or where symbol hints are shown. Various embodiments may default to showing symbol hints.

Which symbol hints are displayed may be changeable. For example, users may select which hints to display and how to display them. Similarly, the ordering of the symbol hints displayed may be changeable. For example, symbol hints may be selected or ordered by the system without explicit user control of the ordering. That is, symbol hints may be selected or ordered based on frequency of use by the individual user or by a population of users, on context of use (e.g. which applications are active, what the user was doing last or recently, locality information), on non-user driven promotion of particular gesture commands or associated applications/web sites, on which gesture commands a recently failed recognition resembled, and the like. As a specific example, if a user is browsing a shopping web site, symbols hints related to shopping and finances may be shown or ordered more visibly in a list, or both. As another specific example, if software designed for young users is active, more kid-centric symbol hints may be displayed or presented higher in a list.

Figure 16:
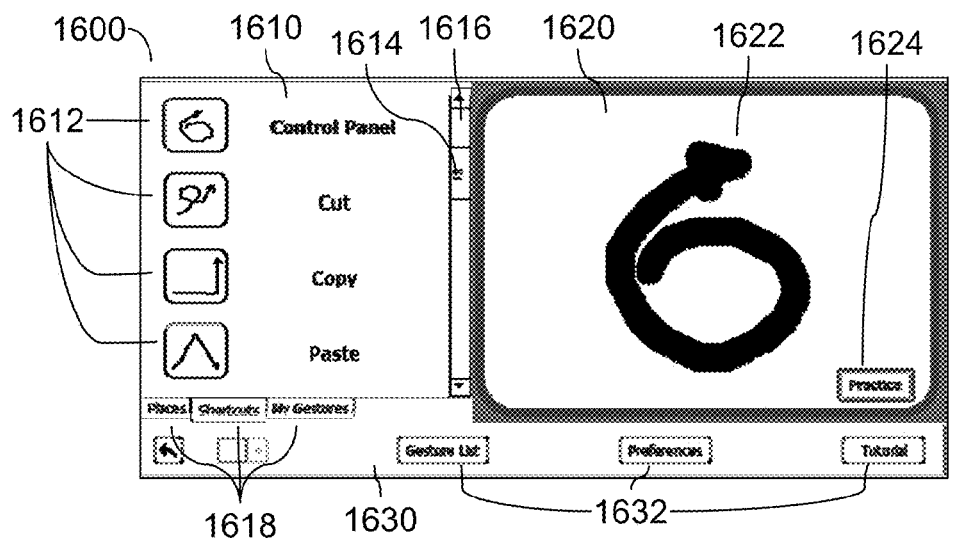
FIGS. 16-18 are example overlays that may be presented when operating in Enhanced Gesturing Mode, in accordance with embodiments of the invention.
Figure 17:
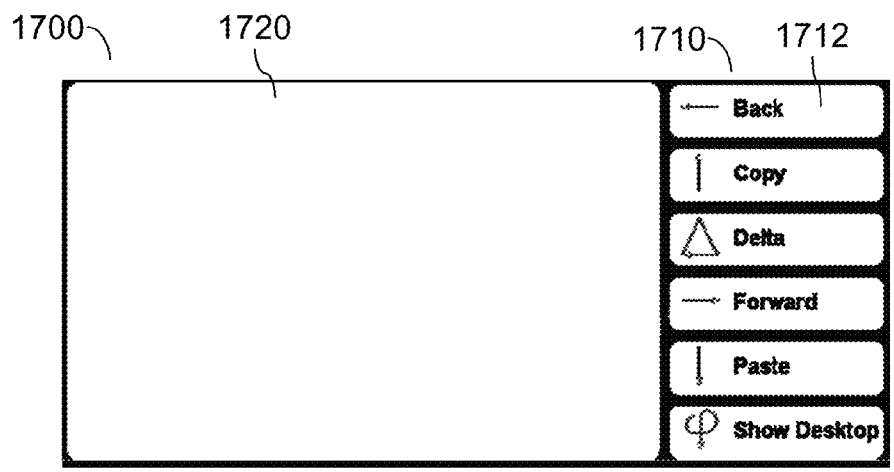
Figure 18:
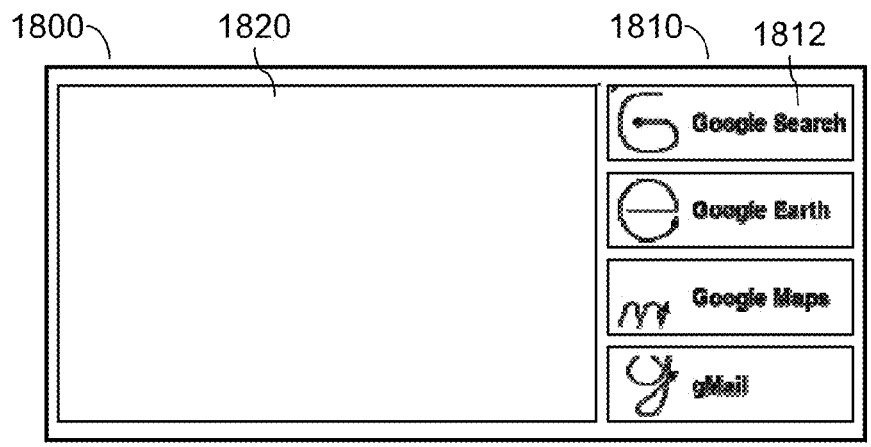

FIGS. 16-18 show some example overlays associated with Enhanced Gesturing Modes, in accordance with embodiments of the invention. Although FIGS. 16-18 show particular user interface elements and other content, organization of content, and appearances, other embodiments may differ in any number of ways.

FIG. 16 shows a first example overlay 1600. The overlay 1600 includes a first section 1610 on the left, a second section 1620 on the right, and a third section 1630 located on the bottom. The first section 1610 contains four symbol hints 1612 ordered in a vertical list. The list is longer than what is displayed, and may be scrolled. This is indicated by a scroll thumb 1614 located in a scroll bar 1616. The first section 1610 also includes tabs 1618 for switching among different groups of symbol hints. In the first overlay 1600, three tabs 1618 are show for "Places," "Shortcuts," and "My Gestures." The different groups may or may not share symbol hints.

The second section 1620 is largely taken up by an entry window 1622 in which a visual representation of a path of a sliding input received while in the Enhanced Gesturing Mode may be shown. In FIG. 16, a path similar to a gesture command for "Control Panel" is shown in the entry window 1622. The third section 1630 includes various controls such as buttons 1632. For example, a "Gesture Set" button can lead a visual representation of gesture commands that the processing system may recognize. The "Preferences" button can lead to a dialog for user control of various settings related to the operation of the symbol recognition and action engine. The "Tutorial" button can lead to various text, graphics, video, or other media for explaining the function of the symbol recognition and action engine.

FIG. 17 shows a second example overlay 1700. The overlay 1700 includes a first section 1710 on the right and a second section 1720 on the left. The first section 1710 contains six symbol hints 1712 ordered in a non-scrollable vertical list. The second section 1720 is mainly an entry window in which a visual representation of a path of a sliding input received while in the Enhanced Gesturing Mode may be shown.

FIG. 18 shows a third example overlay 1800. The overlay 1800 includes a first section 1810 on the right and a second section 1820 on the left. The first section 1810 contains four symbol hints 1712 ordered in a vertical list. The second section 1820 is mainly an entry window in which a visual representation of a path of a sliding input received while in the Enhanced Gesturing Mode may be shown.

Figure 19:
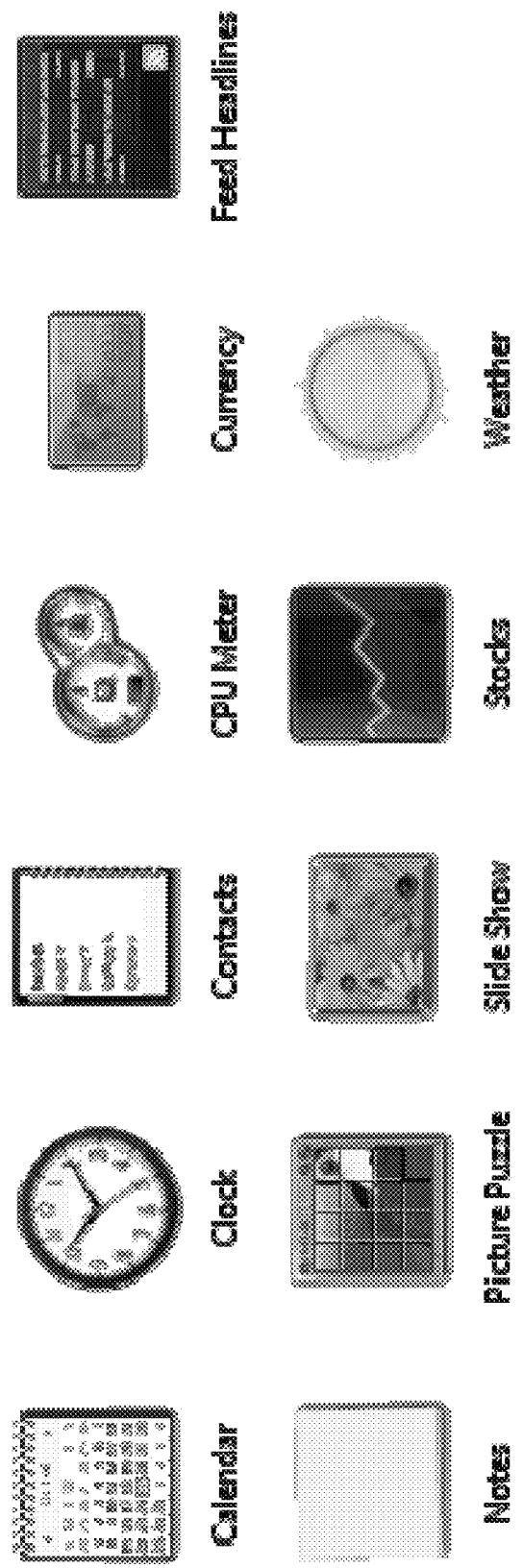
FIG. 19 shows example Independent Information, in accordance with embodiments of the invention.

In some embodiments that display overlays, the overlays are further configured to display information content independent of recognizing input as gesture commands ("Independent Information" for short). Independent Information is information that does not relate to the operation of the symbol recognition and action engine. For example, Independent Information does not include: symbol hints, tabs for selecting between symbol hints, scroll bars for scrolling through symbol hints, buttons for accessing controls related to the recognition or action functions of the processing system (such as to tutorials, images of gesture commands recognized, practice windows, preferences for the symbol recognition and action engine, and the like). As another example, in some embodiments with overlays presented as windows, Independent Information does not include standard manipulation controls for the overlay window. Example standard manipulation controls include: maximize window, minimize window, close window, move window, window boundaries and scroll bars, and the like.

Where Independent Information is presented, some users may activate the processing system even when the users do not intend to input a gesture command. FIG. 19 shows some example Independent Information that may be shown in overlays.

The Independent Information may comprise static images of logos or pictures. In various embodiments, these may be selected by an entity along the supply chain of the electronic system or user. The Independent Information may also change over time or in response to particular events. For example, what Independent Information to show may be selected by users through various ways, including through interacting with selection menus or dialogs with different options of Independent Information. In embodiments with such user-selectable Independent Information, the selection menus (or dialogs or the like) may be provided in any number of ways, including in response to particular user input. For example, a selection menu (or dialogs or the like) may be provided in response to a user providing a Mode Changing Gesture while in the Enhanced Gesturing Mode. This Mode Changing Gesture may be a same one as used to switch into the Enhanced Gesturing Mode.

Examples include information about the weather, stock quotes, date, time, news, word definitions (e.g. of the day), horoscopes, sports scores, system statuses, and the like.

Another example of Independent Information is advertising. The advertising may be integrated into the processing system, an application separate from the processing system, or an alternate source separate from both. The advertising may or may not change in response to which applications are active, what is shown by an associated display screen, which web pages are browsed, etc. Some embodiments provide the advertising in an unobtrusive manner, such that users are not discouraged from using the symbol recognition and action function due to the advertisements. For example, in some embodiments, the advertisements are quite subtle, are limited to one line of text, or are limited to a maximum size. As another example, advertisements may be merged with other Independent Information, such as news information.

In some embodiments that display advertising, a specific gesture or other input can be used to bring up more information about the advertised material, or to open a link associated with the advertisement.

Some embodiments may be configured to display widgets as Independent Information in the overlay. Widgets may display interactive or non-interactive elements, and may or may not be changed over time. Widgets may be controlled by a processing system, by an application or a computing system separate from the processing system, or both. Where a widget is controlled by both the processing system and something separate from the processing system, which one controls may depend on factors such as system status or other context.

Some embodiments utilize widgets of third parties. For example, some embodiments may be configured to utilize the MICROSOFT SIDESHOW application. The SIDESHOW application provides an architecture for manipulating widgets, pushing data to them from various applications, and the like.

In some embodiments that use the widgets of a source separate from the processing system, a visual representation of the widget may be supplied by the processing system, by the source, or by both. For example, a widget may be represented by a modified version of the image supplied by the source. The processing system may modify the image by applying appropriate graphical adjustments such as blending levels with the background, transparency, other images (e.g. images supplied by an entity along the supply chain of an associated electronic system, such as a logo of an OEM), etc.

In some embodiments, which widgets are displayed in overlays may be configured by the user. For example, users may select which widget(s) are shown from a list such as: stock quotes, instant messages, email subject lines, weather, information about currently running applications or currently playing media, other examples shown in FIG. 19, etc. As another example, users may adjust how widgets are shown (e.g. digital or analog clock for time, date format, which stock symbols are used, brightness, size, font, etc.)

Figure 20:
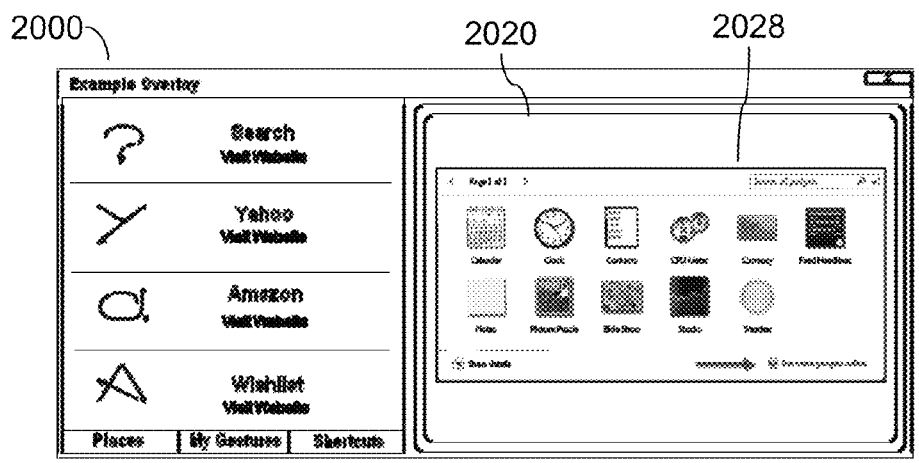
FIG. 20 is an example overlay with selectable Independent Information, in accordance with embodiments of the invention.

FIG. 20 shows example selection screen in an overlay 2000. Overlay 2000 includes an entry window 2020. Within the entry window 2020 is displayed various representations 2028 of Independent Information. Many of these representations 2028 indicate widgets.

Some widgets may be interactive. For example, various widgets may be used to launch applications, open web pages, change in size or shape, and the like. As another example, an email subject line widget may be scrolled to display more of the subject, text of the email that is not part of the subject, or the subjects of multiple emails; or, a stock ticker widget may be selected to provide more information about particular stocks or indices.

Figure 21:
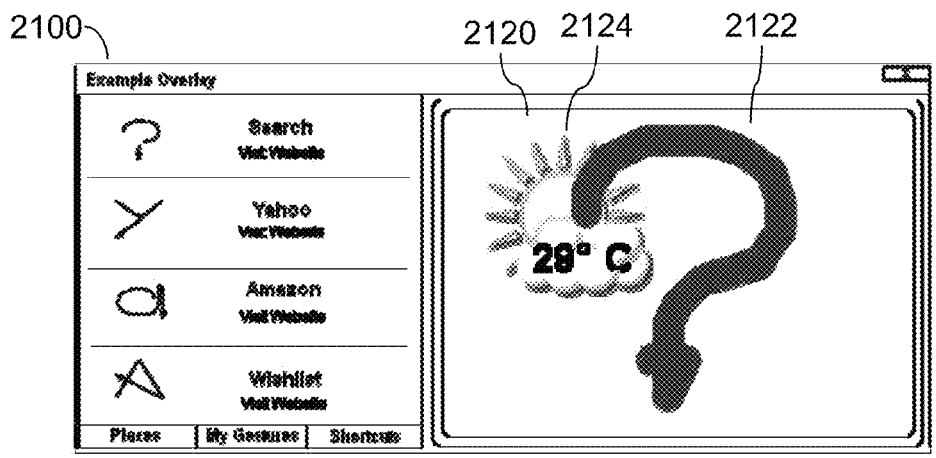
FIGS. 21-22 are example overlays displaying Independent Information, in accordance with embodiments of the invention.
Figure 22:
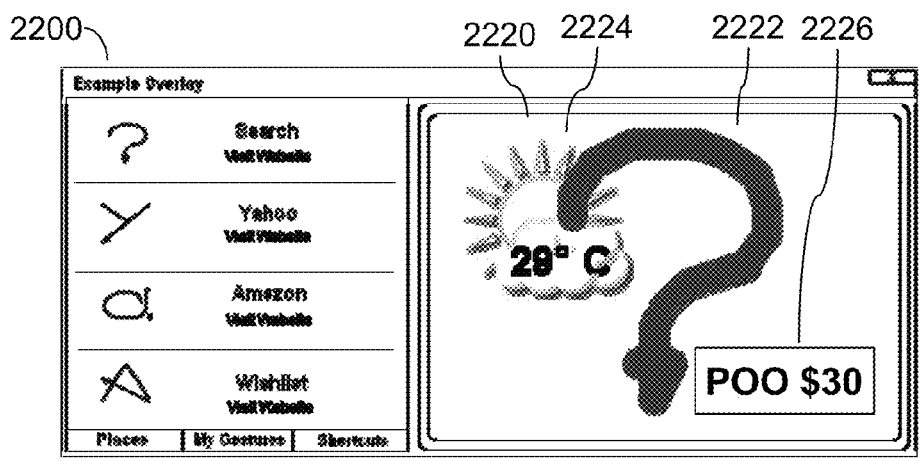

FIGS. 21-22 show two example overlays displaying Independent Information. FIG. 21 shows an overlay 2100 comprising an entry window 2120. The entry window 2120 displays weather information 2124 as well as a visual representation of a path 2122 of a sliding input. The path resembles a question mark, and overlaps the weather information 2124. FIG. 22 shows an overlay 2210 comprising an entry window 2220. The entry window 2220 displays weather information 2224, stock quote 2226, and a visual representation of a path 2222 of a sliding input.

Thus, some embodiments comprise an electronic system comprising a sensor device configured to detect object motion in a sensing region. The electronic system may also comprise a display screen configured to provide a visual display. The electronic system is configured to operate in a pointing mode, where the electronic system is configured to recognize a plurality of types of sliding input in the sensing region as pointing commands for interacting with the visual display while in the pointing mode. The electronic system is also configured to change from operating in the pointing mode to operating in an enhanced gesturing mode, where the electronic system is configured to recognize the plurality of types of sliding input as a plurality of gesture commands associated with a plurality of different gesture actions while in the enhanced gesturing mode. The electronic system is further configured to present an overlay in the visual display when operating in the enhanced gesturing mode, where the overlay presents information content independent of recognizing the plurality of types of sliding inputs as the plurality of gesture commands.

The electronic system may be configured to change from presenting Independent Information of a first category to presenting Independent Information of a second category in response to receiving an indication to change to presenting a second category. Information may be categorized in a variety of ways, and differ between embodiments. For example, information may be categorized by subject matter, by fact vs. opinion, by media type (e.g., text, image, video), by confidentiality level, by personal vs. public, and the like.

The electronic system may also be configured to change the information content without user intervention. For example, the electronic system may be configured to change advertisements based on recent user actions. As another example, the electronic system may be configured to refresh news headlines on a time basis.

Some embodiments are configured to provide feedback in response to a change in operating mode, operation in the Enhanced Gesturing Mode, in response to a recognition attempt, and the like. The feedback may be aural, visual, tactile, or involve some other sense. For example, a change in operating modes may be visually indicated in any variety of ways. For example, a pointer icon, the background color, display brightness, or some other visual element or characteristic may change in response to a mode switch. The indication may differ depending on the mode switched from or the mode switched to. As another example, a visual element or characteristic may be associated with the active operating mode, such that a particular pointer or background color is presented in a particular mode. As yet another example, an overlay may be presented to indicate switching to particular modes such as the Enhanced Gesturing Mode (overlays are discussed further below). Non-visual feedback, such as aural or tactile feedback, may be used instead or to complement visual feedback.

As another example, some embodiments include a mechanism configured to notice that a sliding input received while in the Enhanced Gesturing Mode was not recognized as a gesture command, and providing feedback in response. For example, some embodiments may display help. The help may be provided at the first failed recognition, after a certain number of failed recognitions not separated by a successful recognition, and/or after a certain number of similar sliding inputs which were all not recognized as gesture commands. The help may offer a practice option to the user, or indicate gestures that are determined to be likely to be the intended input. The practice option may include presenting a practice window to allow users to gain familiarity with particular sliding inputs associated with specific gesture commands. The practice window may incorporate real time feedback regarding recognition or no recognition.

Some embodiments allow users to control the feedback by selecting or specifying the feedback. For example, various embodiments have user selectable sounds for modes or gesture command recognition. When aural feedback is to be provided, some embodiments may show a warning dialog if the sound system is muted, or if the volume is set to a low value (e.g. 10% or less of the sound range).

The processing system may have a lower recognition accuracy rate than 100%. Thus, some sliding inputs of a proper type may not be recognized in some cases. Also, in some embodiments, some types of sliding inputs may have no gesture command counterparts, and thus no associated actions.

Some embodiments provide feedback to confirm the recognition of a gesture command (feedback separate from carrying out the associated action(s)). In some embodiments, feedback for gesture command recognitions comprise descriptions of what actions are being undertaken (e.g. conducting search). For example, visual descriptions may comprise pictures or text, and may appear in an overlay or another feature (e.g. a window) associated with the recognition of gesture commands. As another example, aural descriptions may comprise a tone understood to mean particular actions, or spoken words indicative of the actions.

Some embodiments provide visual feedback as images in an overlay associated with the Enhanced Gesturing Mode. For example, in some embodiments, an indicator in the overlay changes in color, brightness, or intensity to indicate the recognition status. For example, an illuminating green indicator may indicate recognition, and an illuminating red indicator may indicate no recognition. Some embodiments provide visual feedback outside of any overlays associated with the Enhanced Gesturing Mode For example, some embodiments using MICROSOFT WINDOWS-type operating systems provide textual feedback with balloons shown near the tray icon. The balloon may contain the name of the gesture command recognized.

Figure 23:
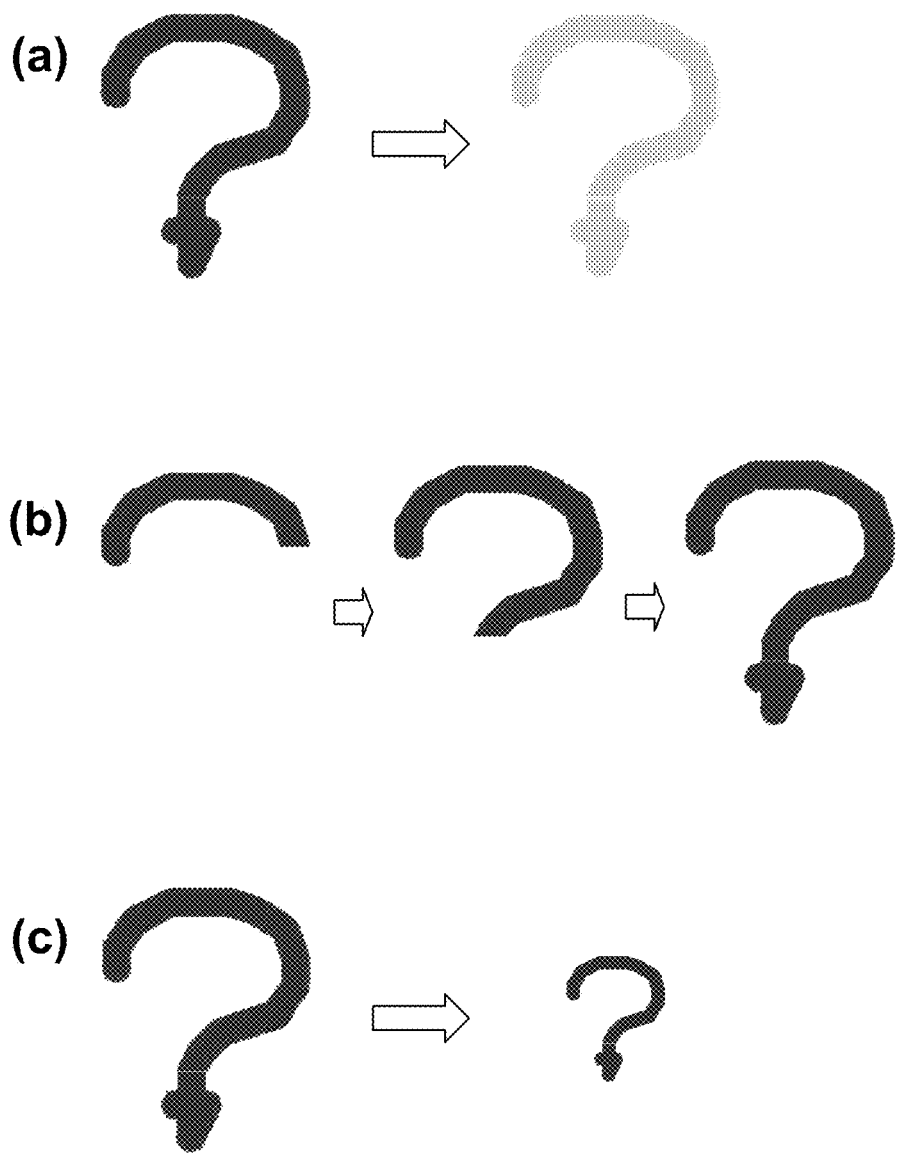
FIGS. 23(a)-(c) show example changes for visual representations of paths of sliding inputs, in accordance with embodiments of the invention.

Some embodiments provide visual feedback by changing the appearance of a visual representation of a path of a sliding input that was recognized as a gesture command. FIGS. 23(a)-(c) show some additional example changes in appearance of a visual representation of a path of a sliding input, in accordance with embodiments of the invention. The visual representation may or may not return to its original appearance after the change.

In FIG. 23(a), the visual representation fades or changes in color. In some embodiments, the visual representation may be changed to a first color, such as to blue. This change may be momentary, and the visual representation or the entire overlay may then fade out or return to its original appearance. As another example, if the sliding input is not recognized as a gesture command, the visual representation may be changed to a second color, such as to red.

In FIG. 23(b), the visual representation is animated to provide feedback. That is, when a sliding input is successfully recognized as a gesture command, a visual representation of a path of the sliding input is animated. The animation illustrates a drawing action tracing out the gesture command. This animation may occur once, or repeat a number of times. The animation may stop with the symbol fully illustrated.

In FIG. 23(c), the visual representation changes in size to provide feedback. In some embodiments, the visual representation shrinks in size. The visual representation may return to an original size after the shrinking. Alternatively, the visual representation may increase in size instead of decreasing in size.

Thus, embodiments may comprise an electronic system comprising a sensor device configured to detect object motion in a sensing region. The electronic system may also comprise a display screen configured to provide a visual display. The electronic system is configured to operate in a pointing mode, wherein the electronic system is configured to recognize a plurality of types of sliding input in the sensing region as pointing commands for interacting with the visual display while in the pointing mode. The electronic system is also configured to operate in an enhanced gesturing mode, wherein the electronic system is configured to recognize the plurality of types of sliding input as a plurality of gesture commands associated with a plurality of gesture actions while in the enhanced gesturing mode. The electronic system is further configured to provide a representation in the visual display of a path of the sliding input received while in the enhanced gesturing mode, and to change an appearance of the representation in the visual display in response to successfully recognizing the sliding input as a gesture command.

The electronic system may be configured in additional ways, such as to selectively present symbol hints based on a history of use of the electronic system, or to enable different functionality in response to successfully authenticating the sensor device.

Thus, the embodiments and examples set forth herein were presented in order to best explain the present invention and its particular application and to thereby enable those skilled in the art to make and use the invention. However, those skilled in the art will recognize that the descriptions and examples included here have been presented for the purposes of illustration and example only. The description as set forth is not intended to be exhaustive or to limit the invention to the precise form disclosed.

For example, input devices other than touch sensor devices, such as mice, joysticks, pointing sticks, track balls, graphic tablets, and the like may be used with the different embodiments described that implement the Enhanced Gesturing Mode functionality.

As another example, some embodiments present teasers to encourage users to use the Enhanced Gesturing Mode. For example, some embodiments that have not operated in the Enhanced Gesturing Mode a specified interval (e.g. spanning days, weeks, or months) present teasers to encourage users to try out this functionality. The teasers may comprise pop ups, sounds, etc.

As a further example, updates may be automatically pushed out to end users. The updates may change the gesture commands recognized, the associated actions, any identifiers that may be used, etc.

As yet another example, some gesture commands may be similar and potentially confused with each other. For example, in some embodiments where users may define new gesture commands, user defined gesture commands may conflict with predefined gesture commands. Some embodiments resolve this conflict by asking for user preferences. For example, various embodiments may highlight potential conflicts to users for resolution separate from receiving a conflicting gesture command, request that users to choose between actions in response to receiving a conflicting gesture command. Some embodiments may also choose the action(s) that are performed as if multiple actions are associated with the same gesture command, as described above.

What is claimed is:

1. A method of operating an electronic system comprising a sensor device configured to detect object motion in a sensing region and a display screen configured to provide a visual display, the method comprising:
   operating in a pointing mode, wherein the electronic system is configured to recognize a type of sliding input in the sensing region as a type of pointing command while in the pointing mode, and wherein the type of pointing command is for interacting with the visual display;
   changing from the pointing mode to an enhanced gesturing mode in response to recognizing a characteristic object motion in the sensing region, wherein the characteristic object motion differs from the type of sliding input;
   operating in the enhanced gesturing mode in response to changing from the pointing mode to the enhanced gesturing mode, wherein the electronic system is configured to recognize the type of sliding input in the sensing region as a gesture command while in the enhanced gesturing mode, and wherein the gesture command is selectively associated with an action based on a locality of the electronic system, wherein the type of sliding input recognized as the gesture command while in the enhanced gesture mode is a same type of sliding input as the type of sliding input recognized as the pointing command while in the pointing mode, and wherein the type of sliding input comprises a lateral movement in the sensing region;
   changing a representation in the visual display of a path of the sliding input at least in response to changing from the pointing mode to the enhanced gesturing mode; and
   producing the action in response to recognizing the sliding input as the gesture command.

2. The method of claim 1, wherein the action comprises navigating to a first web site if the locality is a first locality, and wherein the action comprises navigating to a second web site if the locality is a second locality.

3. The method of claim 1, wherein the locality indicates a location of sale of the electronic system.

4. The method of claim 1, further comprising:
   examining a registry value to determine the locality.

5. The method of claim 1, further comprising:
   authenticating locality information.

6. The method of claim 1, wherein the action is a default action if the locality is indeterminate.

7. The method of claim 1, further comprising:
   presenting an overlay in the visual display when operating in the enhanced gesturing mode, wherein the overlay presents information independent of recognizing sliding inputs as gesture commands.

8. A computer program product comprising:
   (a) a user interface program for operating an electronic system, the user interface program containing instructions for:
      operating in a pointing mode, wherein the electronic system is configured to recognize a type of sliding input in a sensing region as a type of pointing command while in the pointing mode, and wherein the type of pointing command is for interacting with a visual display;
      changing from the pointing mode to an enhanced gesturing mode in response to recognizing a characteristic object motion in the sensing region, wherein the characteristic object motion differs from the type of sliding input; and
      operating in the enhanced gesturing mode in response to changing from the pointing mode to the enhanced gesturing mode, wherein the electronic system is configured to recognize the type of sliding input in the sensing region as a gesture command while in the enhanced gesturing mode, wherein the type of sliding input recognized as the gesture command while in the enhanced gesture mode is a same type of sliding input as the type of sliding input recognized as the pointing command while in the pointing mode, wherein the type of sliding input comprises a lateral movement in the sensing region, and wherein the gesture command is selectively associated with an action based on a locality of the electronic system;
      changing a representation in the visual display of a path of the sliding input at least in response to changing from the pointing mode to the enhanced gesturing mode; and
   (b) a non-transitory computer-readable media on which the user-interface program resides.

9. The computer program product of claim 8, wherein the locality indicates a location of sale of the electronic system, wherein the action comprises navigating to a first web site if the locality is a first locality, and wherein the action comprises navigating to a second web site if the locality is a second locality.

10. A method of operating an electronic system comprising a sensor device configured to detect object motion in a sensing region and a display screen configured to provide a visual display, the method comprising:
   operating in a pointing mode, wherein the electronic system is configured to recognize a plurality of types of sliding input in the sensing region as pointing commands for interacting with the visual display while in the pointing mode;
   changing from operating in the pointing mode to operating in an enhanced gesturing mode in response to recognizing a characteristic object motion in the sensing region which differs from the plurality of types of sliding input, wherein the electronic system is configured to recognize the plurality of types of sliding input as a plurality of gesture commands associated with a plurality of different gesture actions while in the enhanced gesturing mode, wherein the plurality of types of sliding input recognized as the gesture command while in the enhanced gesture mode is a same plurality of types of sliding input as the plurality of types of sliding input recognized as the pointing command while in the pointing mode, and wherein the type of sliding input comprises a lateral movement in the sensing region;

changing a representation in the visual display of a path of a sliding input at least in response to changing from the pointing mode to the enhanced gesturing mode; and presenting an overlay in the visual display when operating in the enhanced gesturing mode, wherein the overlay presents information content independent of recognizing the plurality of types of sliding inputs as the plurality of gesture commands.

11. The method of claim 10, wherein the information content is selected from a group consisting of: news, word definitions, horoscopes, weather information, stock quotes, sports scores, system status, and advertising.

12. The method of claim 10, wherein the information content is of a first category, further comprising:
changing from presenting the first category to presenting a second category in response to receiving an indication to change to presenting the second category.

13. The method of claim 10, further comprising:
changing the information content without user intervention.

14. An electronic system comprising:
a display screen configured to provide a visual display;
a sensor device configured to detect object motion in a sensing region;
a processing system communicatively coupled to the display screen and the sensor device, the processing system configured to:
operate in a pointing mode, wherein the electronic system is configured to recognize a plurality of types of sliding input in the sensing region as pointing commands for interacting with the visual display while in the pointing mode;
change from operating in the pointing mode to operating in an enhanced gesturing mode in response to recognizing a characteristic object motion in the sensing region which differs from the plurality of types of sliding input, wherein the electronic system is configured to recognize the plurality of types of sliding input as a plurality of gesture commands associated with a plurality of different gesture actions while in the enhanced gesturing mode, wherein the plurality of types of sliding input recognized as the gesture command while in the enhanced gesture mode is a same plurality of types of sliding input as the plurality of types of sliding input recognized as the pointing command while in the pointing mode, and wherein the type of sliding input comprises a lateral movement in the sensing region;
changing a representation in the visual display of a path of the sliding input at least in response to changing from the pointing mode to the enhanced gesturing mode; and present an overlay in the visual display when operating in the enhanced gesturing mode, wherein the overlay presents information independent of recognizing the plurality of types of sliding inputs as the plurality of gesture commands.

15. The system of claim 14, wherein the processing system is further configured to:
receive a user indication to change away from presenting the first category of information or to change to presenting a second category of information; and
change from presenting the first category of information to presenting the second category of information in response to the receiving.

16. A method of operating an electronic system comprising a sensor device configured to detect object motion in a sensing region and a display screen configured to provide a visual display, the method comprising:
operating in a pointing mode, wherein the electronic system is configured to recognize a plurality of types of sliding input in the sensing region as pointing commands for interacting with the visual display while in the pointing mode;
changing from the pointing mode to an enhanced gesturing mode in response to recognizing a characteristic object motion in the sensing region, wherein the characteristic object motion differs from the plurality of types of sliding input;
operating in the enhanced gesturing mode in response to changing from the pointing mode to the enhanced gesturing mode, wherein the electronic system is configured to recognize the plurality of types of sliding input as a plurality of gesture commands associated with a plurality of gesture actions while in the enhanced gesturing mode, wherein the plurality of types of sliding input recognized as the gesture command while in the enhanced gesture mode is a same plurality of types of sliding input as the plurality of types of sliding input recognized as the pointing command while in the pointing mode, and wherein the type of sliding input comprises a lateral movement in the sensing region; and
providing a representation in the visual display of a path of the sliding input received while in the enhanced gesturing mode;
changing an appearance of the representation in the visual display in response to recognizing the sliding input as a gesture command and changing from the pointing mode to the enhanced gesturing mode; and
causing a gesture action associated with the gesture command in response to recognizing the sliding input.

17. The method of claim 16, further comprising:
selectively presenting symbol hints in the visual display based on a history of use of the electronic system.

18. The method of claim 16, further comprising:
changing the appearance of the representation in the visual display in response to not recognizing the sliding input as any gesture command.

* * * * *